United States Patent
Komaba et al.

(10) Patent No.: US 10,854,881 B2
(45) Date of Patent: Dec. 1, 2020

(54) BINDER FOR LITHIUM CELL

(71) Applicants: FUJIFILM WAKO PURE CHEMICAL CORPORATION, Osaka (JP); TOKYO UNIVERSITY OF SCIENCE FOUNDATION, Tokyo (JP)

(72) Inventors: Shinichi Komaba, Tokyo (JP); Kiyofumi Yamagiwa, Tokyo (JP); Shoko Aoki, Tokyo (JP); Kuniaki Okamoto, Kawagoe (JP); Takahiro Kiyosu, Kawagoe (JP); Yasuyoshi Mori, Kawagoe (JP); Takatoshi Matsuura, Kawagoe (JP); Michihiko Sato, Kawagoe (JP)

(73) Assignees: TOKYO UNIVERSITY OF SCIENCE FOUNDATION, Tokyo (JP); FUJIFILM WAKO PURE CHEMICAL CORPORATION, Osaka (JP)

(*) Notice: Subject to any disclaimer, the term of this patent is extended or adjusted under 35 U.S.C. 154(b) by 331 days.

(21) Appl. No.: 15/305,521

(22) PCT Filed: Apr. 21, 2015

(86) PCT No.: PCT/JP2015/062049
§ 371 (c)(1),
(2) Date: Oct. 20, 2016

(87) PCT Pub. No.: WO2015/163302
PCT Pub. Date: Oct. 29, 2015

(65) Prior Publication Data
US 2017/0040612 A1 Feb. 9, 2017

(30) Foreign Application Priority Data
Apr. 21, 2014 (JP) ................. 2014-087747

(51) Int. Cl.
| | | |
|---|---|---|
| H01M 4/62 | (2006.01) |
| H01M 4/134 | (2010.01) |
| H01M 4/587 | (2010.01) |
| C08F 220/56 | (2006.01) |
| H01M 4/36 | (2006.01) |
| H01M 4/38 | (2006.01) |
| C08F 220/18 | (2006.01) |
| C08F 220/06 | (2006.01) |
| H01M 10/0525 | (2010.01) |

(52) U.S. Cl.
CPC .......... *H01M 4/622* (2013.01); *C08F 220/06* (2013.01); *C08F 220/18* (2013.01); *C08F 220/56* (2013.01); *H01M 4/134* (2013.01); *H01M 4/36* (2013.01); *H01M 4/38* (2013.01); *H01M 4/386* (2013.01); *H01M 4/587* (2013.01); *H01M 4/62* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 4,748,220 A | 5/1988 | Hartmann et al. | |
| 2007/0269747 A1 | 11/2007 | Bahadur et al. | |
| 2012/0095131 A1* | 4/2012 | Kinoshita | H01M 4/621 523/410 |
| 2014/0205904 A1* | 7/2014 | Sasaki | H01M 4/622 429/217 |
| 2016/0126551 A1 | 5/2016 | Sasaki | |
| 2016/0260976 A1 | 9/2016 | Matsuo et al. | |

FOREIGN PATENT DOCUMENTS

| | | | | |
|---|---|---|---|---|
| EP | 2 858 151 A1 | 4/2015 | | |
| JP | 2001-093575 | * 4/2001 | ............ | H01M 10/40 |
| JP | 2009-80971 A | 4/2009 | | |
| JP | WO 2010098380 | * 9/2010 | ............ | H01M 4/13 |
| JP | 4851092 B2 | 1/2012 | | |

(Continued)

OTHER PUBLICATIONS

English translation of JP 2001-093575 (Year: 2001).*
English translation of WO 2010098380 (Year: 2010).*
Extended (supplementary) European Search Report dated Jan. 9, 2017, issued in counterpart European Application No. 15782731.2. (8 pages).
International Search Report dated Jul. 14, 2015, issued in counterpart International Application No. PCT/JP2015/062049 (2 pages).

*Primary Examiner* — Yoshitoshi Takeuchi
(74) *Attorney, Agent, or Firm* — Westerman, Hattori, Daniels & Adrian, LLP

(57) ABSTRACT

It is an object of the present invention to provide an electrode having superior charge-discharge capacity, even in the case of using an active material containing silicon.

The present invention relates to "a binder for a lithium cell comprises a polymer having a monomer unit derived from acrylic acid, and 1 to 2 kinds of monomer units derived from the compound shown by the general formula (I), the general formula (II), or the general formula (III), as constituents, and cross-linked by a cross-linking agent selected from the compounds described by the following general formulae [1] to [13], and the polymer described by the following general formula [14]", "a composition for producing an electrode of a lithium cell comprising 1) an active material containing silicon, 2) a conductive assistant, and 3) the above-described binder for a cell", and "an electrode for a lithium cell having 1) an active material containing silicon, 2) a conductive assistant, 3) the above-described binder for a cell, and (4) a current collector".

13 Claims, No Drawings

(56) References Cited

FOREIGN PATENT DOCUMENTS

| | | | | |
|---|---|---|---|---|
| JP | 5673987 B1 | 2/2015 | | |
| WO | 2010/098380 A1 | 9/2010 | | |
| WO | WO-2013031690 A1 * | 3/2013 | .............. | C08L 25/10 |
| WO | 2014/051067 A1 | 4/2014 | | |
| WO | 2014/196547 A1 | 12/2014 | | |
| WO | 2015/064570 A1 | 5/2015 | | |

* cited by examiner

BINDER FOR LITHIUM CELL

TECHNICAL FIELD

The present invention relates to a binder, a composition for producing an electrode, and an electrode, to be used in a lithium cell.

BACKGROUND ART

A lithium ion cell, as a secondary cell, has been utilized as a power source of various portable devices, such as a mobile phone, however, in recent years, research and development of large size batteries assuming automotive applications and the like has become active. Therefore, it has become indispensable to further increase energy density of an existing lithium ion cell. Accordingly, use of a high capacity silicon material has attracted attention, as an active material, instead of a carbon-based material. High capacity of silicon is considered to be due to providing higher electric capacity, as compared with the case of using carbon, because silicon is capable of inducing an alloying reaction with lithium electrochemically at room temperature.

However, silicon has been known to cause large volume change (enlarge to 3 times or more) on charge-discharge, when used as an active material. And, this volume change generates destruction of an electrode structure in charge-discharge, and leads to destruction of an electrode. As a result, it had a problem of decrease in charge-discharge capacity.

On the other hand, various attempts of using a binder have been made, aiming at increasing capacity or enhancing stability performance of a cell (PATENT LITERATURES 1 and 2). However, these targeted active materials were mainly carbon materials, and were not those aiming at elimination of the above-described problems in the case of using silicon.

CITATION LIST

Patent Literature

PATENT LITERATURE 1: JP-A-2009-80971
PATENT LITERATURE 2: JP No. 4851092

SUMMARY OF INVENTION

Technical Problem

It is an object of the present invention to provide a superior binder which solves such a problem as described above, and an electrode using the same.

Solution to Problem

The present inventors have variously studied a method for using a polymeric binder, as a solution of the above-described problems, in the case where silicon was used as an active material. As a result, it has been discovered that, by using a cross-linked polymer, as a binder, superior charge-discharge capacity can be obtained, even in the case of using an active material containing silicon, and have thus completed the present invention.

That is the present invention relates to "a binder for a lithium cell comprises a polymer having a monomer unit derived from acrylic acid, and 1 to 2 kinds of monomer units derived from the compound shown by the following general formula (I), general formula (II), or general formula (III), as constituents, and cross-linked by a cross-linking agent selected from the compounds described by the following general formulae [1] to [13], and the polymer described by the following general formula [14]", "a composition for producing an electrode of a lithium cell comprising 1) an active material containing silicon, 2) a conductive assistant, and 3) the above-described binder for a cell", and "an electrode for a lithium cell having 1) an active material containing silicon, 2) a conductive assistant, 3) the above-described binder for a cell, and (4) a current collector".

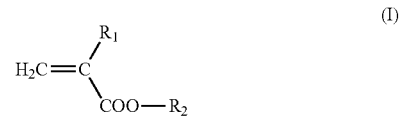

[wherein $R_1$ represents hydrogen atom or a methyl group (provided that in the case where $R_2$ is hydrogen atom, $R_1$ represents a methyl group); $R_2$ represents hydrogen atom, an alkyl group having 1 to 20 carbon atoms; an alkyl group having 1 to 20 carbon atoms, which is substituted with fluorine atom, a hydroxyl group or a cyano group; an aryl group having 6 to 10 carbon atoms; an arylalkyl group having 7 to 13 carbon atoms; an alkoxyalkyl group having 2 to 9 carbon atoms; an alkoxyalkoxyalkyl group having 3 to 9 carbon atoms; an aryloxyalkyl group having 7 to 13 carbon atoms; a morpholinoalkyl group having 5 to 7 carbon atoms; a trialkylsilyl group having 3 to 9 carbon atoms; an alicyclic hydrocarbon group having 6 to 10 carbon atoms, which has oxygen or does not have oxygen; a dialkylaminoalkyl group having 3 to 9 carbon atoms; a hexahydrophthalimide-N-alkyl group having 9 to 15 carbon atoms; the group shown by the following general formula (IV);

(wherein $R_3$ represents an alkylene group having 1 to 6 carbon atoms, which has a hydroxyl group as a substituent or does not have a substituent; $R_4$ represents hydrogen atom, an alkyl group having 1 to 6 carbon atoms, or a phenyl group; "v" represents an integer of 2 to 20.); or the group shown by the following general formula (V):

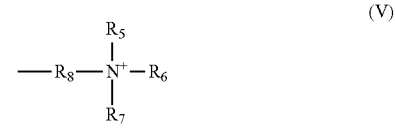

(wherein $R_5$ to $R_7$ each independently represent an alkyl group having 1 to 3 carbon atoms; $R_8$ represents an alkylene group having 1 to 3 carbon atoms.)];

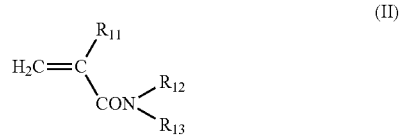

(wherein $R_{11}$ represents hydrogen atom or a methyl group; $R_{12}$ represents hydrogen atom, or alkyl group having 1 to 6 carbon atoms; $R_{13}$ represents hydrogen atom, an alkyl group having 1 to 6 carbon atoms; a dialkylaminoalkyl group having 3 to 9 carbon atoms; or a hydroxyalkyl group having 1 to 6 carbon atoms.);

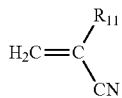
(III)

(wherein $R_{11}$ is the same as described above.);

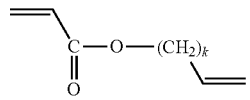
[1]

(wherein k represents an integer of 1 to 6.),

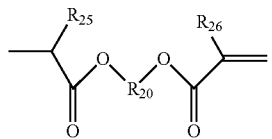
[2]

[wherein $R_{25}$ and $R_{26}$ each independently represent a hydrogen atom or a methyl group; $R^{20}$ represents an alkylene group having 1 to 20 carbon atoms, and a group shown by the following general formula [2-1],

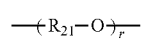
[2-1]

(wherein $R_{21}$ represents an alkylene group having 1 to 6 carbon atoms; r represents an integer of 1 to 6.), or the group shown by the following general formula [2-2],

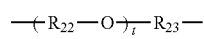
[2-2]

(wherein $R_{22}$ and $R_{23}$ each independently represent an alkylene group having 1 to 6 carbon atoms; t represents an integer of 1 to 12.)],

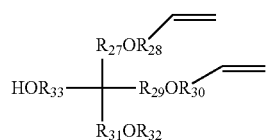
[3]

(wherein $R_{27}$ to $R_{33}$ each independently represent an alkylene group having 1 to 3 carbon atoms.),

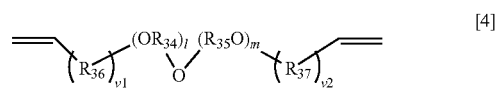
[4]

(wherein $R_{34}$ to $R_{37}$ each independently represent an alkylene group having 1 to 6 carbon atoms; l represents an integer of 1 to 6; m represents an integer of 0 to 6; v1 and v2 each independently represent an integer of 0 or 1.),

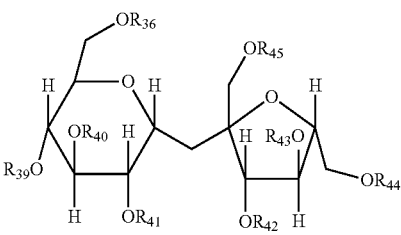
[5]

(wherein $R_{38}$ to $R_{45}$ each independently represent a hydrogen atom, a vinyl group or a vinylketone group, and at least two or more thereof are a vinyl group or a vinylketone group.),

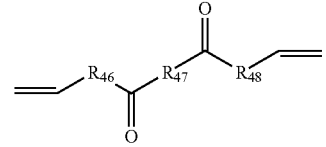
[6]

(wherein $R_{46}$ to $R_{48}$ each independently represent an alkylene group having 1 to 6 carbon atoms.),

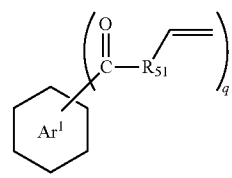
[7]

(wherein ring $Ar^1$ represents benzene ring or naphthalene ring; $R_{51}$ represents an alkylene group having 1 to 6 carbon atoms; q represents an integer of 2 to 4.),

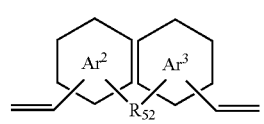
[8]

(wherein ring $Ar^2$ and ring $Ar^3$ each independently represent benzene ring or naphthalene ring; $R_{52}$ represents an alkylene group having 1 to 6 carbon atoms.),

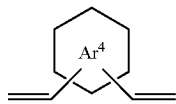

[9]

(wherein ring $Ar^4$ represent benzene ring or naphthalene ring.),

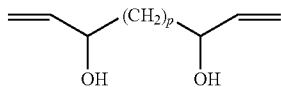

[10]

(wherein p represents an integer of 0 to 6.),

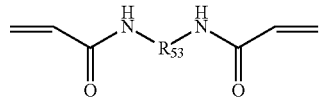

[11]

(wherein, $R_{53}$ represents an alkylene group having 1 to 6 carbon atoms.),

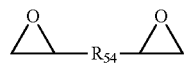

[12]

[wherein $R_{54}$ represents an alkylene group having 1 to 6 carbon atoms, which has or does not have a substituent, an arylene group having 6 to 10 carbon atoms, which has or does not have a substituent, or the group shown by the following general formula [12-A],

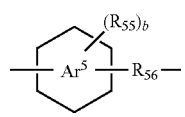

[12-A]

(wherein $R_{55}$ represents an alkyl group having 1 to 6 carbon atoms; $R_{56}$ represents an alkylene group having 1 to 6 carbon atoms; ring $Ar^5$ represents benzene ring or naphthalene ring; "b" represents an integer of 0 to 4.), or the group shown by the following general formula [12-B],

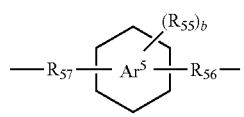

[12-B]

(wherein $R_{57}$ represents an alkylene group having 1 to 6 carbon atoms; $R_{55}$, $R_{56}$, ring $Ar^5$ and "b" are the same as described above.)],

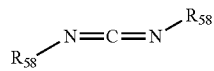

[13]

[wherein $R_{55}$ each independently represent an alkyl group having 1 to 6 carbon atoms, which has or does not have a substituent, an aryl group having 6 to 10 carbon atoms, which has or does not have a substituent, or the group shown by the following general formula [13-A],

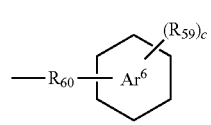

[13-A]

(wherein $R_{59}$ represents an alkyl group having 1 to 6 carbon atoms; $R_{60}$ represents an alkylene group having 1 to 6 carbon atoms; ring $Ar^6$ represents benzene ring or naphthalene ring; "c" represents an integer of 0 to 5.)],

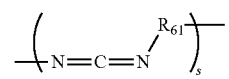

[14]

[wherein $R_{61}$ represents an alkylene group having 1 to 6 carbon atoms, which has or does not have a substituent; an arylene group having 1 to 6 carbon atoms, which has or does not have a substituent; or the group shown by the following general formula [14-A] or [14-B],

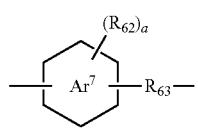

[14-A]

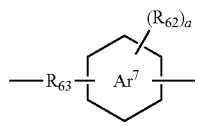

[14-B]

(wherein $R_{62}$ represents an alkyl group having 1 to 6 carbon atoms; $R_{63}$ represents an alkylene group having 1 to 6 carbon atoms; ring $Ar^7$ represents benzene ring or naphthalene ring; and "a" represents an integer of 0 to 4.), or the group shown by following general formula [14-C],

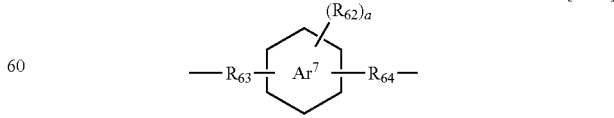

[14-C]

(wherein $R_{64}$ represents an alkylene group having 1 to 6 carbon atoms; $R_{62}$, $R_{63}$, ring $Ar^7$, and "a" are the same as described above.); and "s" represents an integer of 10 to 10000.].

Advantageous Effects of Invention

By producing a lithium electrode using the binder of the present invention, an electrode having high charge-discharge capacity, in particular, high discharge capacity can be provided, even in the case of using an active material containing silicon. In addition, the electrode makes possible to provide a cell which is capable of maintaining high capacity over a long period of time, because of exhibiting high coulombic efficiency in the initial cycle, as well as high capacity retention ratio, even in the case of repeated charge-discharge.

DESCRIPTION OF EMBODIMENTS

[Compound Shown by the General Formula (I)]

The alkyl group having 1 to 20 carbon atoms, in $R_2$ of the general formula (I), is preferably the one having 1 to 10 carbon atoms, more preferably the one having 1 to 6 carbon atoms, and may be any of the linear, branched, or cyclic one, but the straight-chained one is preferable. Specifically it includes, for example, a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a n-hexyl group, a 3-methylpentyl group, a 2-methylpentyl group, a 1,2-dimethylbutyl group, a n-heptyl group, an isoheptyl group, a sec-heptyl group, a n-octyl group, an isooctyl group, a sec-octyl group, a n-nonyl group, a n-decyl group, an n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-icosyl group, a cyclopropyl group, a cyclopentyl group, a cyclohexyl group, a cycloheptyl group, a cyclooctyl group, a cyclodecyl group, a cycloundecyl group, a cyclododecyl group, a cyclotetradecyl group, a cyclooctadecyl group, or the like, and among them, a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a n-hexyl group, or the like, is preferable, a methyl group, an ethyl group, a n-propyl group, a n-butyl group, a n-pentyl group, or a n-hexyl group is more preferable, an n-butyl group, a n-pentyl group, or a n-hexyl group is further preferable, and a n-hexyl group is particularly preferable.

As the alkyl group having 1 to 20 carbon atoms, which is substituted with fluorine atom in $R_2$ of the general formula (1), the one fluorinated at the terminal part is preferable, the one having 1 to 10 carbon atoms is preferable, but the linear one is preferable. Specifically it includes, for example, a fluoroethyl group, a fluoropropyl group, a fluorobutyl group, a fluoropentyl group, a fluorohexyl group, a fluoroheptyl group, a fluorooctyl group, a perfluorooctyl group, a fluorononyl group, a fluorodecyl group, a fluorododecyl group, a fluorotetradecyl group, a fluoropentadecyl group, a fluorohexadecyl group, a fluoroheptadecyl group, a fluorooctadecyl group, a fluorononadecyl group, a fluoroicosyl group, a trifluoromethyl group, a perfluoroethyl group, a perfluoropropyl group, a perfluorobutyl group, a perfluoropentyl group, a perfluorohexyl group, a (perfluorohexyl)methyl group, a (perfluorohexyl)ethyl group, a (perfluorohexyl)propyl group, a (perfluorobutyl)methyl group, a (perfluorobutyl)ethyl group, a (perfluorobutyl)propyl group, a trifluoromethyl group, a trifluoroethyl group, a trifluoropropyl group, or the like, and among them, a trifluoromethyl group, a perfluoroethyl group, a perfluoropropyl group, a perfluorobutyl group, a perfluoropentyl group, a perfluorohexyl group, a (perfluorohexyl)methyl group, a (perfluorohexyl)ethyl group, a (perfluorohexyl)propyl group, a (perfluorobutyl)methyl group, a (perfluorobutyl) ethyl group, a (perfluorobutyl)propyl group, a trifluoromethyl group, a trifluoroethyl group, a trifluoropropyl group, or the like are preferable, a (perfluorohexyl)methyl group, a (perfluorohexyl)ethyl group, a (perfluorobutyl)methyl group, a (perfluorobutyl) ethyl group, a trifluoromethyl group, or a trifluoroethyl group is more preferable, and a (perfluorohexyl) ethyl group is particularly preferable.

As the alkyl group having 1 to 20 carbon atoms, which is substituted with a hydroxyl group, in $R_2$ of the general formula (1), the one substituted with a hydroxyl group at the terminal part is preferable, the one in which 1 or 2 pieces of hydrogens are substituted with a hydroxyl group is more preferable, and the one in which 1 piece of hydrogen is substituted with a hydroxyl group is further preferable. The one having 1 to 6 carbon atoms is preferable, but the linear one is preferable. For example, it includes a hydroxyethyl group, a dihydroxyethyl group, a hydroxypropyl group, a dihydroxypropyl group, a hydroxybutyl group, a dihydroxybutyl group, a hydroxypentyl group, a dihydroxypentyl group, a hydroxyhexyl group, a dihydroxyhexyl group, a hydroxyheptyl group, a hydroxyoctyl group, a hydroxynonyl group, a hydroxydecyl group, a hydroxydodecyl group, a hydroxytetradecyl group, a hydroxypentadecyl group, a hydroxyhexadecyl group, a hydroxyheptadecyl group, a hydroxyoctadecyl group, a hydroxynonadecyl group, a hydroxyicosyl group, or the like, and among them, a hydroxymethyl group, a hydroxyethyl group, a dihydroxyethyl group, a hydroxypropyl group, a dihydroxypropyl group, a hydroxybutyl group, a dihydroxybutyl group, a hydroxypentyl group, a dihydroxypentyl group, a hydroxyhexyl group, or a dihydroxyhexyl group is preferable, a hydroxymethyl group, a hydroxyethyl group, a hydroxypropyl group, or the like, is more preferable, and a hydroxyethyl group is particularly preferable.

As the alkyl group having 1 to 20 carbon atoms, which is substituted with a cyano group, in $R_2$ of the general formula (I), the one substituted with a cyano group at the terminal part is preferable, the one in which 1 or 2 pieces of hydrogens are substituted with a cyano group is more preferable, and the one in which 1 piece of hydrogen is substituted with a cyano group is further preferable. The one having 1 to 6 carbon atoms is preferable, but the linear one is preferable. Specifically it includes, for example, a cyanomethyl group, a cyanoethyl group, a cyanopropyl group, a cyanobutyl group, a cyanopentyl group, a cyanohexyl group, a cyanoheptyl group, a cyanooctyl group, a cyanononyl group, a cyanodecyl group, a cyanododecyl group, a cyanotetradecyl group, a cyanopentadecyl group, a cyanohexadecyl group, a cyanoheptadecyl group, a cyanooctadecyl group, a cyanononadecyl group, a cyanoicosyl group, or the like, and among them, a cyanomethyl group, a cyanoethyl group, a cyanopropyl group, a cyanobutyl group, a cyanopentyl group, or a cyanohexyl group is preferable, a cyanomethyl group, a cyanoethyl group, or a cyanopropyl group is more preferable, and a cyanoethyl group is particularly preferable.

The aryl group having 6 to 10 carbon atoms, in $R_2$ of the general formula (I), includes a phenyl group, a naphthyl group, or the like, and a phenyl group is preferable.

As the arylalkyl group having 7 to 13 carbon atoms, in $R_2$ of the general formula (I), the one having 7 to 9 carbon atoms is preferable, and specifically it includes, for example, a benzyl group, a phenylethyl group, a phenylpropyl group, a naphthylmethyl group, a naphthylethyl group, a naphthylpropyl group, or the like, and a benzyl group is preferable.

The alkoxyalkyl group having 2 to 9 carbon atoms, in $R_2$ of the general formula (I), includes a methoxymethyl group, a methoxyethyl group, a methoxypropyl group, a methoxybutyl group, a methoxypentyl group, a methoxyhexyl group, a methoxyheptyl group, a methoxyoctyl group, an ethoxymethyl group, an ethoxyethyl group, an ethoxypropyl group, an ethoxybutyl group, an ethoxypentyl group, an ethoxyhexyl group, an ethoxyheptyl group, a propoxymethyl group, a propoxyethyl group, a propoxypropyl group, a propoxybutyl group, a propoxypentyl group, a propoxyhexyl group, or the like.

The alkoxyalkoxyalkyl group having 3 to 9 carbon atoms, in $R_2$ of the general formula (I), includes a methoxymethoxymethyl group, a methoxymethoxyethyl group, a methoxymethoxypropyl group, an ethoxymethoxymethyl group, an ethoxymethoxyethyl group, an ethoxymethoxypropyl group, a propoxymethoxymethyl group, a propoxymethoxyethyl group, a propoxymethoxypropyl group, an ethoxyethoxymethyl group, an ethoxyethoxyethyl group, an ethoxyethoxypropyl group, an ethoxyethoxymethyl group, an ethoxyethoxyethyl group, an ethoxyethoxypropyl group, a propoxyethoxymethyl group, a propoxyethoxyethyl group, a propoxyethoxypropyl group, or the like.

As the aryloxyalkyl group having 7 to 13 carbon atoms, in $R_2$ of the general formula (I), the one having 7 to 9 carbon atoms is preferable, and specifically it includes, for example, a phenoxymethyl group, a phenoxyethyl group, a phenoxypropyl group, a naphthyloxymethyl group, a naphthyloxyethyl group, a naphthyloxypropyl group, or the like, a phenoxymethyl group, a phenoxyethyl group, a phenoxypropyl group, or the like, is preferable, and a phenoxyethyl group is more preferable.

The morpholinoalkyl group having 5 to 7 carbon atoms, in $R_2$ of the general formula (I), includes, for example, a morpholinomethyl group, a morpholinoethyl group, a morpholinopropyl group, or the like.

The trialkylsilyl group having 3 to 9 carbon atoms, in $R_2$ of the general formula (I), includes, for example, a trimethylsilyl group, a triethylsilyl group, a tripropylsilyl group, a dimethylethylsilyl group, a diethylmethylsilyl group, or the like.

The alicyclic hydrocarbon group having 6 to 10 carbon atoms, which has oxygen atom, in $R_2$ of the general formula (I), includes a dicyclopentenyloxyethyl group, or the like.

The alicyclic hydrocarbon group having 6 to 10 carbon atoms, which does not have oxygen atom, in $R_2$ of the general formula (I), includes a cyclohexyl group, an isobornyl group, a dicyclopentanyl group, or the like.

The dialkylaminoalkyl group having 3 to 9 carbon atoms, in $R_2$ of the general formula (I), includes a dimethylaminomethyl group, a dimethylaminoethyl group, a dimethylaminopropyl group, a diethylaminomethyl group, a diethylaminoethyl group, a diethylaminopropyl group, a dipropylaminomethyl group, a dipropylaminoethyl group, a dipropylaminopropyl group, or the like.

The alkyl group of the hexahydrophthalimide-N-alkyl group, in $R_2$ of the general formula (I), is usually the one having 1 to 6 carbon atoms, preferably the one having 1 to 3 carbon atoms, and preferably the linear one. The hexahydrophthalimide-N-alkyl group having 9 to 15 carbon atoms includes, for example, a 2-hexahydrophthalimidemethyl group, a 2-hexahydrophthalimideethyl group, a 2-hexahydrophthalimidepropyl group, a 2-hexahydrophthalimidebutyl group, a 2-hexahydrophthalimidepentyl group, a 2-hexahydrophthalimidehexyl group, or the like.

As the alkylene group having 1 to 6 carbon atoms, which has a hydroxyl group as substituent, in $R_3$ of the general formula (IV), the one having 1 to 3 carbon atoms is preferable, and specifically it includes a hydroxymethylene group, a hydroxyethylene group, a hydroxy-n-propylene group, a hydroxy-n-butylene group, a hydroxy-n-pentylene group, a hydroxy-n-hexylene group, or the like, a hydroxymethylene group, a hydroxyethylene group, or a hydroxy-n-propylene group is preferable, and a hydroxy-n-propylene group is more preferable.

As the alkylene group having 1 to 6 carbon atoms, which does not have a substituent, in $R_3$ of the general formula (IV), the one having 1 to 3 carbon atoms is preferable, and specifically it includes a methylene group, an ethylene group, a n-propylene group, a n-butylene group, a n-pentylene group, a n-hexylene group, or the like, a methylene group, an ethylene group, or a n-propylene group is preferable, and an ethylene group is more preferable.

Among the above-described specific examples, as $R_3$ of the general formula (IV), the alkylene group having 1 to 6 carbon atoms, which does not have a substituent, is preferable, the alkylene group having 1 to 3 carbon atoms, which does not have a substituent, is more preferable, and an ethylene group is particularly preferable.

As the alkyl group having 1 to 6 carbon atoms, in $R_4$ of the general formula (IV), the one having 1 to 3 carbon atoms is preferable, and it may be any of the linear, branched or cyclic one, but the linear one is preferable. Specifically, it includes, for example, a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a n-hexyl group, or the like, and among them, a methyl group, an ethyl group, a n-propyl group, or an isopropyl group is preferable, and a methyl group is more preferable.

As $R_4$ of the general formula (IV), hydrogen atom, an alkyl group having 1 to 3 carbon atoms, a phenyl group, or the like is preferable, and hydrogen atom, a methyl group, or the like, is more preferable.

"v" in the general formula (IV) is preferably 2 to 10, and more preferably 4 to 10. In addition, each of "v" pieces of —($R_3$—O)— groups may be the same or the different.

Specific examples of the groups shown by the general formula (IV) include a polyethylene glycol group, a methylpolyethylene glycol group, an ethylpolyethylene glycol group, a propylpolyethylene glycol group, and the like, and among them, a polyethylene glycol group, a methylpolyethylene glycol group, and the like, are preferable.

The alkyl group having 1 to 3 carbon atoms, in $R_5$ to $R_7$ of the general formula (V), includes a methyl group, an ethyl group, a propyl group, or the like, and a methyl group is preferable.

The alkylene group having 1 to 3 carbon atoms, in Re of the general formula (V), includes a methylene group, an ethylene group, a propylene group, or the like.

Specific examples of the groups shown by the general formula (V) include a trimethylammoniummethyl group, a trimethylammoniumethyl group, a triethylammoniummethyl group, a triethylammoniumethyl group, and the like.

As $R_2$ of the general formula (I), among the above-described groups, the alkyl group having 1 to 20 carbon atoms; the alkyl group having 1 to 20 carbon atoms, which is substituted with fluorine atom, a hydroxyl group or a cyano group; the aryloxyalkyl group having 7 to 13 carbon atoms; the group shown by the general formula (IV); or hydrogen atom is preferable; the alkyl group having 1 to 20 carbon atoms, which is substituted with fluorine atom, a hydroxyl group, or a cyano group; the aryloxyalkyl group having 7 to 13 carbon atoms; the group shown by the general formula (IV), or hydrogen atom is more preferable; the alkyl group having 1 to 20 carbon atoms, which is substituted with fluorine atom, a hydroxyl group or a cyano group; or hydrogen atom is further preferable, and the alkyl group having 1 to 20 carbon atoms, which is substituted with a hydroxyl group; or hydrogen atom is particularly preferable.

Preferable specific examples of the above-described general formula (I) includes the compounds shown by the following general formulae (I-I).

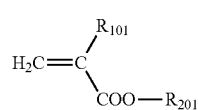

(I-I)

[wherein $R_{101}$ represents hydrogen atom or a methyl group (provided that when $R_{201}$ is hydrogen atom, $R_{101}$ represents a methyl group); $R_{201}$ represents hydrogen atom, the alkyl group having 1 to 20 carbon atoms, the alkyl group having 1 to 20 carbon atoms, substituted with fluorine atom, a hydroxyl group or a cyano group, the arylalkyl group having 7 to 13 carbon atoms, the aryloxyalkyl group having 7 to 13 carbon atoms, the hexahydrophthalimide-N-alkyl group having 9 to 15 carbon atoms, or the group shown by the following general formula (IV-I).

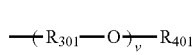

(IV-I)

(wherein $R_{301}$ represents the alkylene group having 1 to 3 carbon atoms, which has a hydroxyl group as a substituent; $R_{401}$ represents hydrogen atom, the alkyl group having 1 to 6 carbon atoms, or a phenyl group; and "v" is the same as described above.)].

The alkyl group having 1 to 20 carbon atoms, the alkyl group having 1 to 20 carbon atoms, substituted with fluorine atom, a hydroxyl group or a cyano group, the arylalkyl group having 7 to 13 carbon atoms, the aryloxyalkyl group having 7 to 13 carbon atoms, and the hexahydrophthalimide-N-alkyl group having 9 to 15 carbon atoms, in $R_{201}$ of the above-described general formula (I-I), include the same ones as described in the item of the alkyl group having 1 to 20 carbon atoms, the alkyl group having 1 to 20 carbon atoms, substituted with fluorine atom, a hydroxyl group or a cyano group, the arylalkyl group having 7 to 13 carbon atoms, the aryloxyalkyl group having 7 to 13 carbon atoms, and the hexahydrophthalimide-N-alkyl group having 9 to 15 carbon atoms, in $R_2$ of the above-described general formula (I), and the preferable ones are also the same.

As $R_{201}$ of the general formula (I-I), the alkyl group having 1 to 20 carbon atoms, the alkyl group having 1 to 20 carbon atoms, substituted with fluorine atom, a hydroxyl group or a cyano group, the aryloxyalkyl group having 7 to 13 carbon atoms, the group shown by the general formula (IV-I), or hydrogen atom is preferable, the alkyl group having 1 to 20 carbon atoms, substituted with fluorine atom, a hydroxyl group or a cyano group, or hydrogen atom is more preferable, and the alkyl group having 1 to 20 carbon atoms, substituted with a hydroxyl group, or hydrogen atom is particularly preferable.

The alkylene group having 1 to 3 carbon atoms, which has a hydroxyl group as a substituent, or does not have a substituent, in $R_{301}$ of the general formula (IV-I), includes a methylene group, an ethylene group, a propylene group, a hydroxymethylene group, a hydroxyethylene group, a hydroxypropylene group, or the like, and among them, an ethylene group, or a hydroxypropylene group is preferable.

The alkyl group having 1 to 6 carbon atoms, in $R_{401}$ of the general formula (IV-I), includes the same ones as specific examples of $R_4$ of the above-described general formula (IV), and the preferable ones are also the same.

Preferable specific examples of the above-described general formula (I) includes the compounds shown by the following general formulae (I-II).

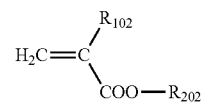

(I-II)

[wherein $R_{102}$ represents hydrogen atom or a methyl group (provided that when $R_{202}$ is hydrogen atom, $R_{102}$ represents a methyl group); $R_{202}$ represents hydrogen atom, the alkyl group having 1 to 20 carbon atoms, the alkyl group having 1 to 20 carbon atoms, substituted with fluorine atom, a hydroxyl group or a cyano group, the aryloxyalkyl group having 7 to 13 carbon atoms, or the group shown by the following general formula (IV-II).

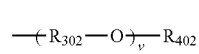

(IV-II)

(wherein $R_{302}$ represents the alkylene group having 1 to 3 carbon atoms; $R_{402}$ represents the alkyl group having 1 to 6 carbon atoms; and "v" is the same as described above.)].

The alkyl group having 1 to 20 carbon atoms, the alkyl group having 1 to 20 carbon atoms, substituted with fluorine atom, a hydroxyl group or a cyano group, and the aryloxyalkyl group having 7 to 13 carbon atoms, in $R_{202}$ of the above-described general formula (I-II), includes the same one as specific examples of the alkyl group having 1 to 20 carbon atoms, the alkyl group having 1 to 20 carbon atoms, substituted with fluorine atom, a hydroxyl group or a cyano group, and the aryloxyalkyl group having 7 to 13 carbon atoms, in Re of the above-described general formula (I), and the preferable ones are also the same.

As $R_{202}$ of the general formula (I-II), the alkyl group having 1 to 20 carbon atoms, substituted with fluorine atom, a hydroxyl group or a cyano group, the aryloxyalkyl group having 7 to 13 carbon atoms, the group shown by the general formula (IV-II), or hydrogen atom is preferable, the alkyl group having 1 to 20 carbon atoms, substituted with fluorine atom, a hydroxyl group or a cyano group, or hydrogen atom is more preferable, and the alkyl group having 1 to 20 carbon atoms, substituted with a hydroxyl group, or hydrogen atom is particularly preferable.

The alkylene group having 1 to 3 carbon atoms, in $R_{302}$ of the general formula (IV-II), includes a methylene group, an ethylene group, or a propylene group, and among them, an ethylene group, is preferable.

The alkyl group having 1 to 6 carbon atoms, in $R_{402}$ of the general formula (IV-II), includes the same one as the specific example of $R_4$ of the above-described general formula (IV) and preferable ones are also the same.

More specific examples of the compounds shown by the above-described general formula (I) include, for example, methacrylic acid, hydroxymethyl (meth)acrylate, hydroxyethyl (meth)acrylate, hydroxypropyl (meth)acrylate, hydroxybutyl (meth) acrylate, hydroxypentyl (meth) acrylate, hydroxyhexyl (meth)acrylate, dihydroxypropyl (meth) acrylate, polyethylene glycol monomethyl ether (meth)acrylate, polyethylene glycol (meth) acrylate, cyanomethyl (meth) acrylate, cyanoethyl (meth) acrylate, 2-(perfluorohexyl) ethyl (meth) acrylate, phenoxymethyl (meth)acrylate, phenoxyethyl (meth)acrylate, phenoxypropyl (meth)acrylate, and the like, and among them, methacrylic acid, hydroxymethyl (meth)acrylate, hydroxyethyl (meth) acrylate, hydroxypropyl (meth) acrylate, hydroxybutyl (meth) acrylate, hydroxypentyl (meth) acrylate, hydroxyhexyl (meth)acrylate, phenoxymethyl (meth)acrylate, phenoxyethyl (meth) acrylate, phenoxypropyl (meth) acrylate, and the like, are preferable, and methacrylic acid, hydroxymethyl (meth) acrylate, hydroxyethyl (meth) acrylate, hydroxypropyl (meth)acrylate, and the like, are more preferable.

The compound shown by the above-described general formula (I) may be the commercially available one, or may be synthesized by a method known per se.

[Compound Shown by the General Formula (II)]

As for $R_{11}$ of the general formula (II), hydrogen atom is preferable.

As the alkyl group having 1 to 6 carbon atoms, in $R_{12}$ and $R_{13}$ of the general formula (II), the alkyl group having 1 to 3 carbon atoms is preferable. Specifically, it includes, a methyl group, an ethyl group, a n-propyl group, an isopropyl group, a n-butyl group, an isobutyl group, a sec-butyl group, a tert-butyl group, a n-pentyl group, an iso-pentyl group, a sec-pentyl group, a tert-pentyl group, a neopentyl group, a n-hexyl group, a 3-methylpentyl group, a 2-methylpentyl group, a 1,2-dimethylbutyl group, or the like, and among them, a methyl group, an ethyl group, a n-propyl group, an isopropyl group, or the like is preferable, and an isopropyl group is more preferable.

As the dialkylaminoalkyl group having 3 to 9 carbon atoms, in $R_{13}$ of the general formula (II), the one having 3 to 6 carbon atoms is preferable. Specific examples thereof include, for example, a dimethylaminomethyl group, a dimethylaminoethyl group, a dimethylaminopropyl group, a diethylaminomethyl group, a diethylaminoethyl group, a diethylaminopropyl group, a dipropylaminomethyl group, a dipropylaminoethyl group, a dipropylaminopropyl group, and the like.

As the hydroxyalkyl group having 1 to 6 carbon atoms, in $R_{13}$ of the general formula (II), the one having 1 to 3 carbon atoms is preferable, the one in which 1 to 2 pieces of hydrogen atoms are substituted with a hydroxyl group is preferable, the one in which 1 piece of hydrogen atom is substituted with a hydroxyl group is more preferable, and it specifically includes, for example, a hydroxymethyl group, a hydroxyethyl group, a hydroxypropyl group, a hydroxybutyl group, a hydroxypentyl group, a hydroxyhexyl group, or the like, and a hydroxyethyl group is preferable.

It is preferable that $R_{12}$ and $R_{13}$ of the general formula (II) each independently are hydrogen atom, or an alkyl group having 1 to 6 carbon atoms; hydrogen atom, or an alkyl group having 1 to 3 carbon atoms is more preferable; and the case where both are hydrogen atoms is still more preferable.

Preferable specific examples of the above-described general formula (II) includes the compounds shown by the following general formulae (II-I).

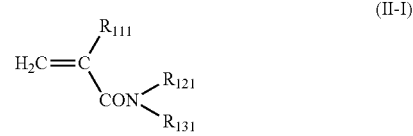

(II-I)

(wherein $R_{111}$ represents hydrogen atom or a methyl group; $R_{121}$ represents hydrogen atom, the alkyl group having 1 to 6 carbon atoms; and $R_{131}$ represents hydrogen atom, the alkyl group having 1 to 6 carbon atoms, or the hydroxyalkyl having 1 to 6 carbon atoms.).

The alkyl group having 1 to 6 carbon atoms, in $R_{121}$ and $R_{131}$ of the general formula (II-I), includes the same ones as specific examples the alkyl group having 1 to 6 carbon atoms, in the above-described $R_{12}$ and $R_{13}$, and the preferable ones are also the same.

The hydroxyalkyl group having 1 to 6 carbon atoms, in $R_{131}$ of the general formula (II-I), includes the same ones as specific examples the hydroxyalkyl group having 1 to 6 carbon atoms in the above-described $R_{13}$, and the preferable ones are also the same.

Preferable specific examples of the above-described general formula (II) includes the compounds shown by the following general formula (II-II).

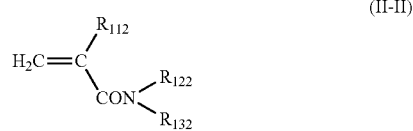

(II-II)

(wherein $R_{112}$ represents hydrogen atom or a methyl group; $R_{122}$ and $R_{132}$ each independently represent hydrogen atom, the alkyl group having 1 to 3 carbon atoms.).

As the alkyl group having 1 to 3 carbon atoms, in $R_{122}$ and $R_{132}$ of the general formula (II-II), a methyl group, an ethyl group, a n-propyl group, an isopropyl group, or the like is preferable, and an isopropyl group is more preferable.

More specific examples of the compounds shown by the general formula (II) include (meth)acrylamide, N-dimethyl (meth)acrylamide, N-methyl(meth)acrylamide, N-ethyl (meth)acrylamide, N-propyl(meth)acrylamide, N-isopropyl (meth)acrylamide, N-butyl(meth)acrylamide, N-pentyl (meth)acrylamide, N-hexyl(meth)acrylamide, N,N-dimethyl (meth) acrylamide, N,N-diethyl (meth) acrylamide, hydroxyethyl (meth)acrylamide, and the like, (meth)acrylamide, N,N-dimethyl(meth)acrylamide, N-methyl(meth) acrylamide, N-ethyl (meth) acrylamide, N-propyl (meth) acrylamide, and the like are preferable, (meth)acrylamide, N-propyl(meth)acrylamide, and the like are more preferable, (meth)acrylamide is further preferable, and acrylamide is particularly preferable.

The compound shown by the above-described general formula (II) may be the commercially available one, or may be synthesized by a method known per se.

[Compound Shown by the General Formula (III)]

As for $R_{11}$ of the general formula (III), hydrogen atom is preferable. That is, the compound shown by the general formula (III) includes acrylonitrile, methacrylonitrile, or the like, and acrylonitrile is preferable. In addition, the compound shown by the general formula (III) may be the commercially available one, or may be the one synthesized by a method known per se.

[Compounds Described in the General Formulae [1] to [13] and Polymer Described in the General Formula [14]]

"k" in the general formula [1] pertaining to the present invention is usually 1 to 6, preferably 1 to 3, and more preferably 1. In addition, the "k" pieces of —(CH$_2$)— groups may be the same or different.

Preferable specific examples of the compounds shown by the general formula [1] pertaining to the present invention include, for example, the compounds shown by the following formulae [1-1] to [1-6], and the like, and the formula [1-1] is particularly preferable.

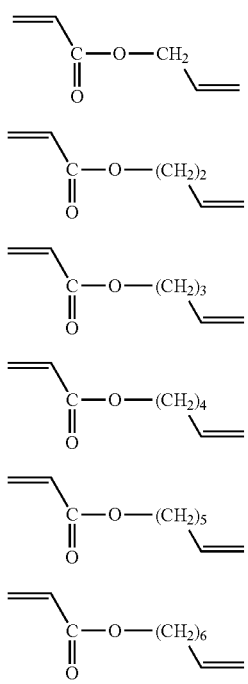

The alkylene group having 1 to 20 carbon atoms, in $R_{20}$ of the general formula [2] pertaining to the present invention, may be any of the linear, branched, or cyclic one, but the linear one is preferable. In addition, the one having 1 to 12 carbon atoms is preferable, and the one having 1 to 6 carbon atoms is more preferable. Specifically, it includes, for example, a methylene group, an ethylene group, a n-propylene group, an isopropylene group, a n-butylene group, an isobutylene group, a sec-butylene group, a tert-butylene group, a n-pentylene group, an isopentylene group, a sec-pentylene group, a tert-pentylene group, a neopentylene group, a n-hexylene group, an isohexylene group, a sec-hexylene group, a tert-hexylene group, an, a n-heptylene group, an isoheptylene group, a sec-heptylene group, a tert-heptylene group, a n-octylene group, a sec-octylene group, a tert-octylene group, a nonylene group, a decylene group, an undecylene group, a dodecylene group, a tridecylene group, a tetradecylene group, a pentadecylene group, a hexadecylene group, a heptadecylene group, an octadecylene group, a nonadecylene group, an icosylene group, a cyclopropylene group, a cyclopentylene group, a cyclohexylene group, a cycloheptylene group, a cyclooctylene group, a cyclononylene group, a cyclodecylene group, a cycloundecylene group, a cyclododecylene group, a cyclotridecylene group, a cyclohexadecylene group, a cyclooctadecylene group, a cycloicosylene group, or the like, and among them, a methylene group, an ethylene group, a n-propylene group, a n-butylene group, a n-pentylene group, a n-hexylene group, a n-heptylene group, a n-octylene group, a nonylene group, a decylene group, an undecylene group, a dodecylene group, or the like, is preferable.

The alkylene group having 1 to 6 carbon atoms, in $R_{21}$, $R_{22}$, or $R_{23}$ of the general formula [2-1] or [2-2] pertaining to the present invention, may be any of the linear, branched, or cyclic one, but the linear one is preferable. In addition, number of carbon atoms is preferably 1 to 3, more preferably 2 to 3, and particularly preferably 2. Specifically, it includes, for example, a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group, a cyclohexylene group, or the like, and a methylene group, an ethylene group, or a propylene group is preferable, and an ethylene group, or a propylene group is more preferable.

"r" in the general formula [2-1] pertaining to the present invention is preferably an integer of 2 to 6, and more preferably an integer of 4 to 6. The "r" pieces of —($R_{21}$—O—)— groups may be the same or different.

"t" in the general formula [2-2] pertaining to the present invention is preferably an integer of 1 to 7, more preferably an integer of 1 to 5, and still more preferably an integer of 1 to 3. The "t" pieces of —($R_{22}$—O—)— groups may be the same or different.

Preferable specific examples of the groups shown by the general formula [2-1] pertaining to the present invention include, for example, the compounds shown by the following general formulae [2-1-1] to [2-1-3], and the like, and among them, the group shown by [[2-1-2] is preferable.

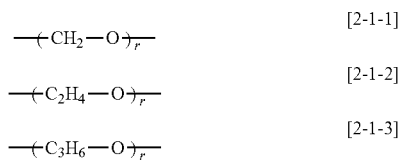

(wherein any of "r" is the same as described above.)

Preferable specific examples of the groups shown by general formula [2-2] pertaining to the present invention include, for example, the compounds shown by the following general formulae [2-2-1] to [2-2-3], and the like.

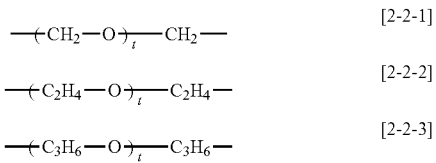

(wherein any of "t" is the same as described above.)

Preferable specific examples of the compounds shown by the general formula [2] pertaining to the present invention include the compounds shown by the following general formulae [2-01] to [2-14], and the like, and among them, the general formulae [2-05] to [2-07] and [2-12] to [2-14] are preferable, the general formulae [2-06] and [2-13] are more preferable, and [2-06] is particularly preferable.

[2-01]
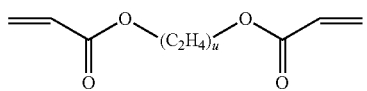

(wherein "u" represents an integer of 1 to 6, however, 4 to 6 is preferable, and 6 is more preferable.)

[2-02]
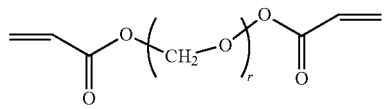

[2-03]
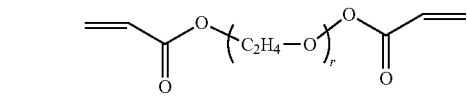

[2-04]
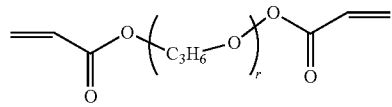

(wherein any of "r" is the same as described above.)

[2-05]
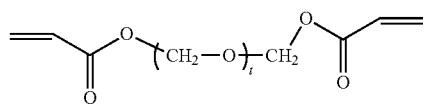

[2-06]
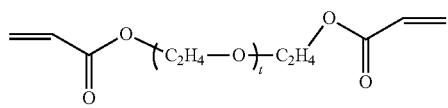

[2-07]
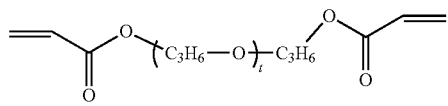

(wherein any of "t" is the same as described above.)

[2-08]
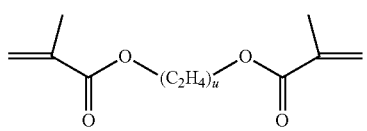

(wherein "u" represents an integer of 1 to 6, however, 4 to 6 is preferable, and 6 is more preferable.)

[2-09]
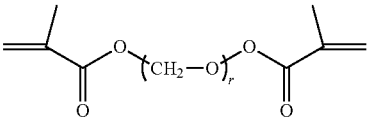

[2-09]
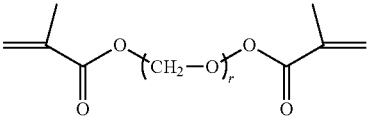

[2-11]
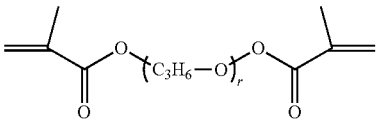

(wherein any of "r" is the same as described above.)

[2-12]
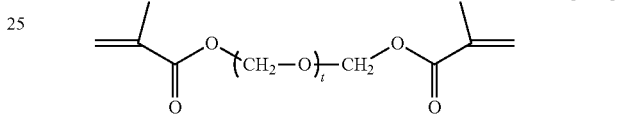

[2-13]
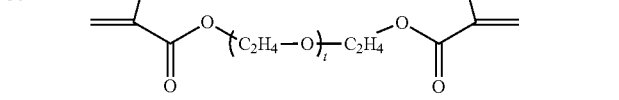

[2-14]
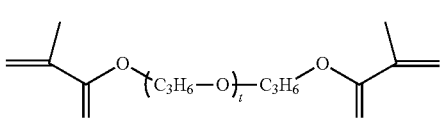

(wherein any of "t" is the same as described above.)

The alkylene group having 1 to 3 carbon atoms, in $R_{27}$ to $R_{32}$ of the general formula [3] pertaining to the present invention, may be the linear, or branched one, but the linear one is preferable. In addition, the one having 1 to 2 carbon atoms is preferable, and 1 is more preferable. It includes specifically, for example, a methylene group, an ethylene group, a trimethylene group, or the like; a methylene group, or an ethylene group is preferable; and a methylene group is more preferable.

Preferable specific examples of the compounds shown by the general formula [3] pertaining to the present invention include, for example, the compounds shown by the following general formulae [3-1] to [3-3], and the like, and formula [3-1] is particularly preferable.

[3-1]
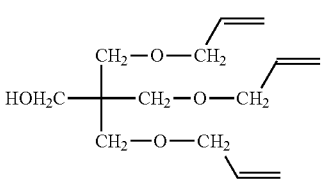

-continued

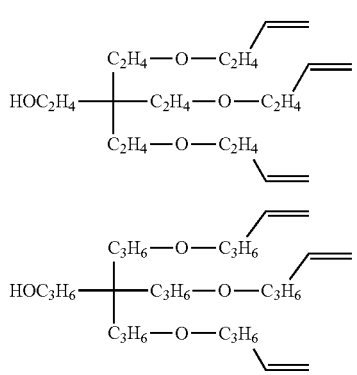

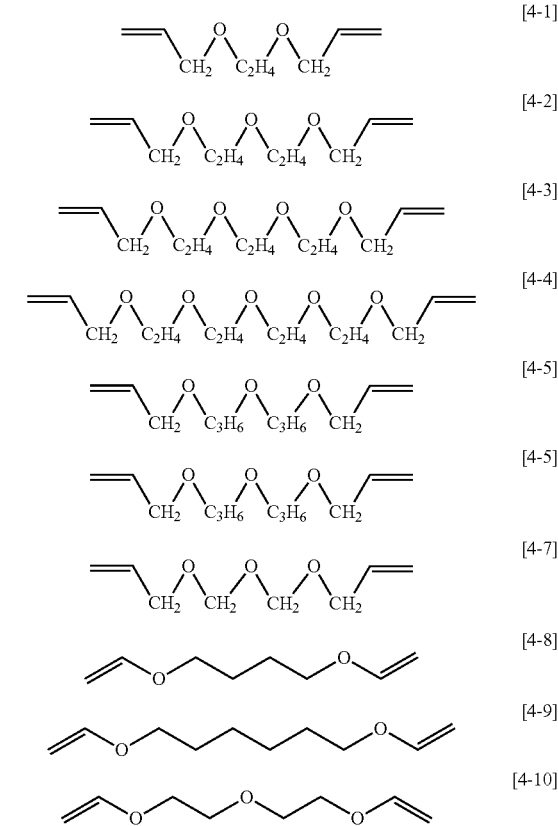

The alkylene group having 1 to 6 carbon atoms, in $R_{34}$ to $R_{37}$ of the general formula [4] pertaining to the present invention, includes the same one as the alkylene group having 1 to 6 carbon atoms, in $R_{21}$ of the above-described general formula [2-1].

"l" represents an integer of 1 to 6, and an integer of 1 to 4 is preferable. In the case where "l" is 2 or larger, each of a plurality of $R_{34}$s may be the same or different.

"m" represents an integer of 0 to 6, an integer of 1 to 3 is preferable, and 1 is more preferable. In the case where "m" is 2 or larger, each of a plurality of $R_{35}$s may be the same or different. It should be noted that, in the case where "m" is 0, —$R_{35}$O— represents an atomic bond. That is, it represents that adjacent —O— and —($R_{37}$)$_{v2}$— directly bind. Hereafter the atomic bond means similarly.

"v1" and "v2" each independently represent an integer of 0 or 1. It should be noted than in the case where "v1" is 0, —$R_{36}$— represents an atomic bond, and in the case where "v2" is 0, —$R_{37}$— represents an atomic bond.

Specific examples of the compound shown by the general formula [4] pertaining to the present invention include, for example, the following general formula [4'] or the general formula [4"], and the like, and among them the general formula [4'] is preferable.

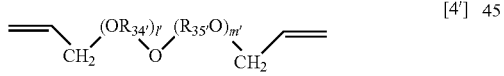

[wherein $R_{34'}$ and $R_{35'}$ represent a methylene group, an ethylene group, or a n-propylene group (preferably, an ethylene group); "l'" represents an integer of 1 to 2; and "m'" represents an integer of 0 to 2.]

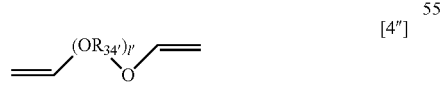

(wherein $R_{34''}$ represents a methylene group, an ethylene group, a n-propylene group, a n-butylene group, a n-pentylene group, a n-hexylene group; and "l''" represents an integer of 1 to 4.)

Preferable specific examples of the general formula [4] include, for example, the compounds shown by the following formulae [4-1] to [4-10], and the like, and among them, formulae [4-1] to [4-4] are preferable.

As for $R_{38}$ to $R_{45}$ of the general formula [5] pertaining to the present invention, it is enough that at least two or more may be vinyl groups or vinylketone groups, however, the one where 5 to 8 pieces are vinyl groups or vinylketone groups is preferable, and the one where 5 to 7 pieces are vinyl groups or vinylketone groups is more preferable.

Preferable specific examples of the compounds shown by the general formula [5] pertaining to the present invention include, for example, the compounds shown by the following general formulae [5-1] to [5-6], and the like.

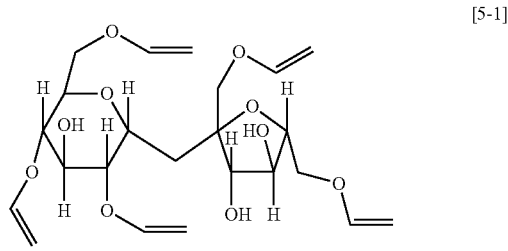

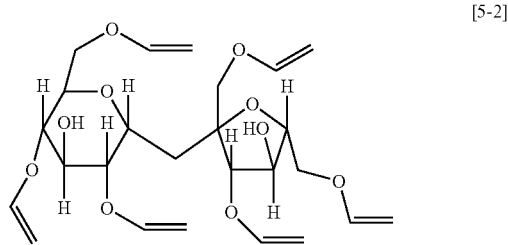

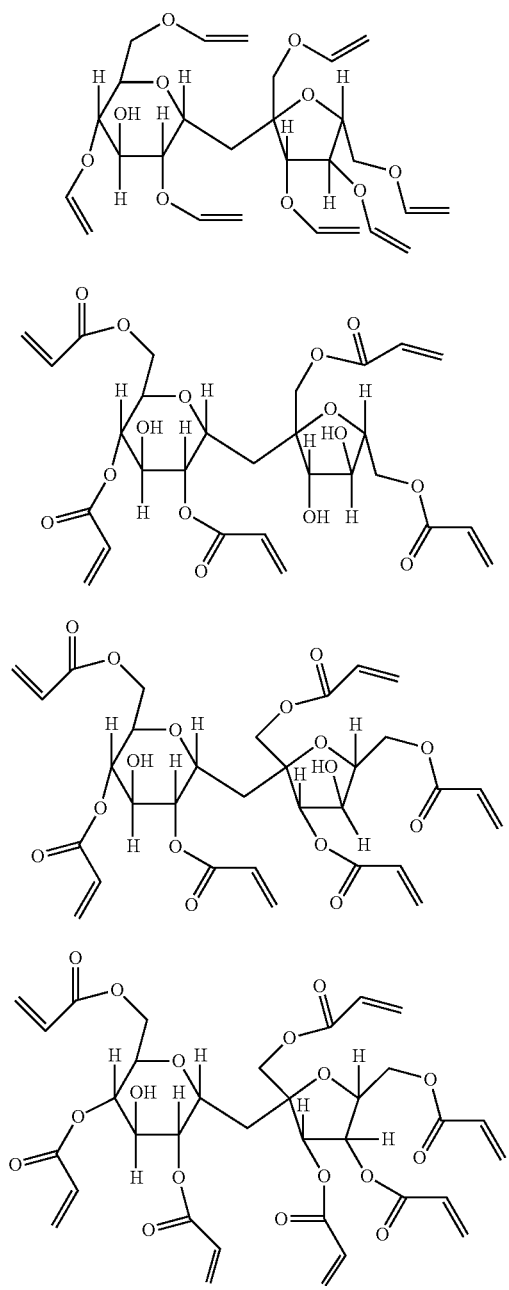

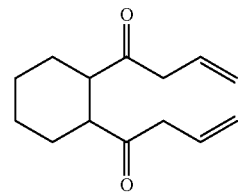

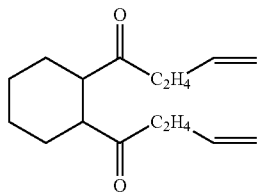

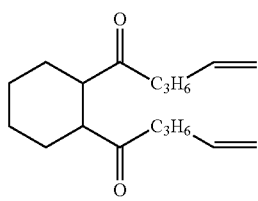

The alkylene group having 1 to 6 carbon atoms, in $R_{46}$ to $R_{48}$ of the general formula [6] pertaining to the present invention, includes the same one as the alkylene group having 1 to 6 carbon atoms, in $R_{21}$ of the above-described general formula [2-1]. As preferable ones, a methylene group and an ethylene group are preferable in $R_{46}$ and $R_{48}$, while in $R_{47}$, a cyclopentylene group, and a cyclohexylene group are preferable, and a cyclohexylene group is more preferable.

Preferable specific examples of the compounds shown by the general formula [6] pertaining to the present invention include, for example, the compounds shown by the following general formulae [6-1] to [6-3], and the like, and among them, formula [6-1] is preferable.

As the alkylene group having 1 to 6 carbon atoms, in $R_{51}$ of the general formula [7] pertaining to the present invention, the one having 1 to 3 carbon atoms is preferable. Specifically, it includes the same one as the alkylene group having 1 to 6 carbon atoms, in $R_{21}$ of the above-described general formula [2-1]. As a preferable one, a methylene group or an ethylene group is preferable and a methylene group is more preferable.

As for the ring $Ar^1$ of the general formula [7] pertaining to the present invention, benzene ring is preferable.

"q" represents an integer of 2 to 4, and preferably an integer of 3 to 4. In addition, "q" pieces of the following groups may be the same or different.

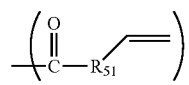

Preferable specific examples of the compounds shown by the general formula [7] pertaining to the present invention include, for example, the compounds shown by the following general formulae [7-1] to [7-2], and the like.

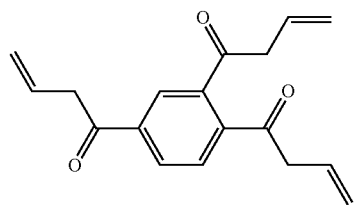

[7-2]

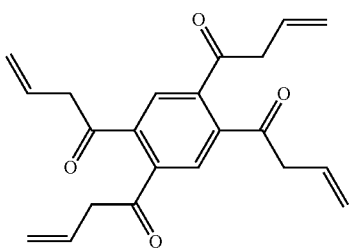

As for the ring $Ar^2$ and ring $Ar^3$ of the general formula [8] pertaining to the present invention, benzene ring is preferable.

The alkylene group having 1 to 6 carbon atoms, in $R_{52}$ of the general formula [8] pertaining to the present invention, includes the same one as the alkylene group having 1 to 6 carbon atoms, in $R_{21}$ of the above-described general formula [2-1]. As the preferable one, a methylene group or an ethylene group is preferable, and an ethylene group is more preferable.

Preferable specific examples of the compounds shown by the general formula [8] pertaining to the present invention include, for example, the compounds shown by the following formulae [8-1] to [8-2], and the like, and formula [8-1] is preferable.

[8-1]

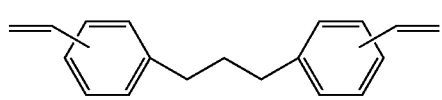

[8-2]

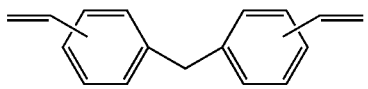

As for the ring $Ar^4$ of the general formula [9] pertaining to the present invention, benzene ring is preferable.

Preferable specific examples of the compounds shown by the general formula [9] pertaining to the present invention include, for example, the compounds shown by the following formulae [9-1] to [9-2], and the like, and formula [9-1] is preferable.

[9-1]

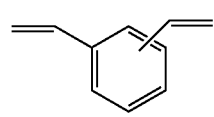

[9-2]

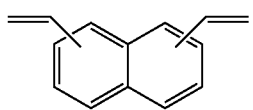

As for "p" in the general formula [10] pertaining to the present invention, 0 to 2 is preferable, and 0 is particularly preferable.

Preferable specific examples of the compounds shown by the general formula [10] pertaining to the present invention include, for example, the compounds shown by the following formulae [10-1] to [10-4], and the like, and formula [10-1] is preferable.

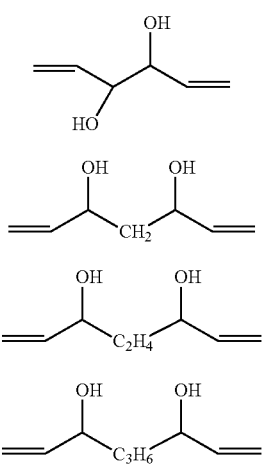

The alkylene group having 1 to 6 carbon atoms, in $R_{53}$ of the general formula [11] pertaining to the present invention, includes the same one as the alkylene group having 1 to 6 carbon atoms, in $R_{21}$ of the above-described general formula [2-1]. As the preferable one, a methylene group, an ethylene group, or a n-propylene group is preferable, and a methylene group is more preferable.

Preferable specific examples of the compounds shown by the general formula [11] pertaining to the present invention include, for example, the compounds shown by the following formulae [11-1] to [11-3], and the like, and formula [11-1] is preferable.

[11-1]

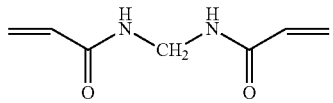

[11-2]

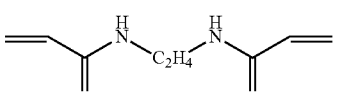

[11-3]

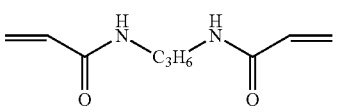

The alkylene group having 1 to 6 carbon atoms, in $R_{54}$ of the general formula [12] pertaining to the present invention, may be any of the linear, branched, or cyclic one, and specifically includes, for example, a methylene group, an ethylene group, a trimethylene group, a propylene group, a methylmethylene group, a methylethylene group, an ethylmethylene group, a tetramethylene group, a pentamethylene group, a hexamethylene group, a cyclopropylene group, a cyclopentylene group, a cyclohexylene group, or the like.

As for the arylene group having 6 to 10 carbon atoms, in $R_{54}$ of the general formula [12] pertaining to the present invention, the one having 6 carbon atoms is included preferably. It includes specifically, for example, a phenylene group, a naphthylene group, or the like, and a phenylene group is preferable.

The alkyl group having 1 to 6 carbon atoms, in $R_{55}$ of the general formulae [12-A] and [12-B] pertaining to the present invention, may be any of the linear, branched, or cyclic one, but the linear one is preferable. Specifically, it includes, for example, a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a n-hexyl group, or the like.

The alkylene group having 1 to 6 carbon atoms, in $R_{56}$ of general formulae [12-A] and [12-B] pertaining to the present invention, includes the same one as the alkylene group having 1 to 6 carbon atoms in the above-described $R_{54}$.

As for the ring $Ar^5$ of the general formulae [12-A] and [12-B] pertaining to the present invention, benzene ring is preferable.

"b" of the general formulae [12-A] and [12-B] pertaining to the present invention is preferably 0 to 1. The case where "b" is 0 means that benzene ring or naphthalene ring of the ring $Ar^5$ does not have a substituent.

The alkylene group having 1 to 6 carbon atoms, in $R_{57}$ of the general formula [12-B] pertaining to the present invention, includes the same one as the alkylene group having 1 to 6 carbon atoms in the above-described $R_{54}$.

Preferable specific examples of the compounds shown by the general formula [12] include, for example, the compounds shown by the following formulae [12-1] to [12-4], and the like.

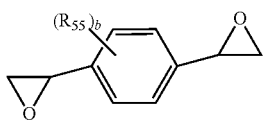

[12-1]

(wherein $R_{55}$ and "b" are the same as described above.),

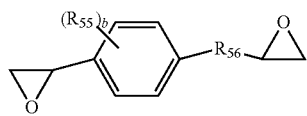

[12-2]

(wherein $R_{55}$, $R_{56}$, and "b" are the same as described above.),

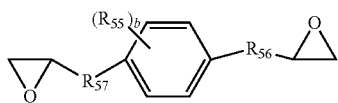

[12-3]

(wherein $R_{55}$, $R_{56}$, $R_{57}$, and "b" are the same as described above.),

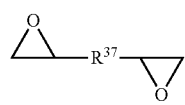

[12-4]

(wherein $R_{57}$ is the same as described above.)

The alkyl group having 1 to 6 carbon atoms, in $R_{58}$ of the general formula [13] pertaining to the present invention, includes the same one as the alkyl group having 1 to 6 carbon atoms, in $R_{55}$ of the above-described general formula [12-A] pertaining to the present invention.

The aryl group having 6 to 10 carbon atoms, in $R_{58}$ of the general formula [13] pertaining to the present invention, includes the same one as the aryl group having 6 to 10 carbon atoms in $Ar^1$ of the above-described general formula [7] pertaining to the present invention, and a substituent also includes the same one.

The alkyl group having 1 to 6 carbon atoms, in $R_{59}$ of the general formula [13-A] pertaining to the present invention, includes the same one as the alkyl group having 1 to 6 carbon atoms, in $R_{55}$ of [12-A].

The alkylene group having 1 to 6 carbon atoms, in $R_{59}$ of the general formula [13-A] pertaining to the present invention, includes the same one as the alkylene group having 1 to 6 carbon atoms in the above-described $R_{54}$.

As for the ring $Ar^6$ of the general formula [13-A] pertaining to the present invention, benzene ring is preferable.

"c" of the general formula [13-A] pertaining to the present invention represents an integer of 0 to 5, and preferably an integer of 0 to 2. The case where "c" is 0 means that benzene ring or naphthalene ring of the ring $Ar^6$ does not have a substituent.

Preferable specific examples of the general formula [13] include the following general formulae [13-1], [13-2], and the like. Among them, the general formula [13-1] is preferable. In the general formula [13-1], the case where $R_{59}$ is a methyl group, an ethyl group, a n-propyl group, an isopropyl group, or the like is preferable, and an isopropyl group is more preferable. In the general formula [13-1], the one where "c" is 1 to 3 is preferable, and 2 is more preferable.

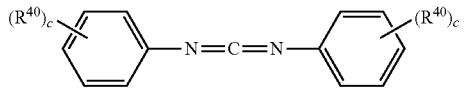

[13-1]

(wherein $R_{59}$ represents an alkyl group having 1 to 6 carbon atoms; and "c" represents an integer of 0 to 4.)

[13-2]

The alkylene group having 1 to 6 carbon atoms, in $R_{61}$ of the general formula [14] pertaining to the present invention, includes the same one as the alkylene group having 1 to 6 carbon atoms in $R_{54}$ of the above-described general formula [12] pertaining to the present invention, and a substituent also includes the same one.

The arylene group having 6 to 10 carbon atoms, in $R_{61}$ of the general formula [14] pertaining to the present invention, includes the same one as the arylene group having 6 to 10 carbon atoms in the above-described $R_{54}$ of the general formula [12] pertaining to the present invention, and a substituent also includes the same one.

The alkyl group having 1 to 6 carbon atoms, in $R_{62}$ of the general formulae [14-A] to [14-C] pertaining to the present invention, includes the same one as the alkyl group having 1 to 6 carbon atoms in $R_{55}$ of the general formula [12-A].

The alkylene group having 1 to 6 carbon atoms, in $R_{63}$ of the general formulae [14-A] to [14-C] pertaining to the present invention, includes the same one as the alkylene group having 1 to 6 carbon atoms in the above-described $R_{54}$.

As for the ring $Ar^7$ of the general formulae [14-A] to [14-C] pertaining to the present invention, benzene ring is preferable.

"a" of the general formulae [14-A] and [14-C] pertaining to the present invention is preferably 0 to 1. The case where "a" is 0 means that benzene ring or naphthalene ring of the ring $Ar^7$ does not have a substituent.

The alkylene group having 1 to 6 carbon atoms, in $R_{64}$ of the general formula [14-C] pertaining to the present invention, includes the same one as the alkylene group having 1 to 6 carbon atoms in the above-described $R_{54}$.

As for $R_{61}$ of the general formula [14] pertaining to the present invention, the alkylene group having 1 to 6 carbon atoms, which has a substituent; an alkylene group having 1 to 6 carbon atoms, which does not have a substituent; the arylene group having 6 to 10 carbon atoms, which has a substituent; or the arylene group having 6 to 10 carbon atoms, which does not have a substituent, is preferable, and among them, the arylene group having 6 to 10 carbon atoms, which has a substituent, is preferable, and the arylene group having 6 to 10 carbon atoms, which has an alkyl group as a substituent, is particularly preferable.

"s" of the general formula [14] pertaining to the present invention is usually 10 to 10,000, preferably 10 to 1,000, and more preferably 10 to 100.

Preferable specific examples of the general formula [14] include the following general formulae [14-1] to [14-5], and the like.

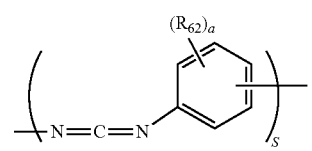
[14-1]

(wherein $R_{62}$, "a" and "s" are the same as described above.),

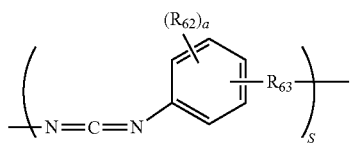
[14-2]

(wherein $R_{63}$ represents an alkylene group having 1 to 6 carbon atoms; and $R_{62}$, "a", and "s" are the same as described above.),

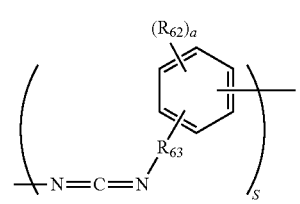
[14-3]

(wherein $R_{62}$, $R_{63}$, "a" and "s" are the same as described above.),

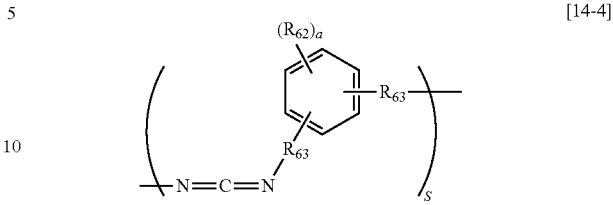
[14-4]

(wherein $R_{62}$, $R_{63}$, "a" and "s" are the same as described above, provided that two $R_{63}$s are each independent and may be different groups.),

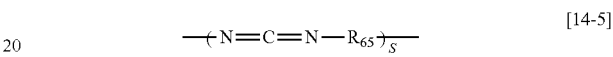
[14-5]

(wherein $R_{65}$ represents an alkylene group having 1 to 6 carbon atoms; and "s" is the same as described above.)

Among them, the general formula [14-1] is preferable, and more specifically, it includes the following general formulae [14-1-1] to [14-1-3], or the like, and the general formula [14-1-1] is preferable.

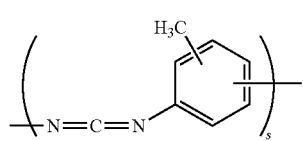
[14-1-1]

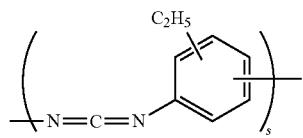
[14-1-2]

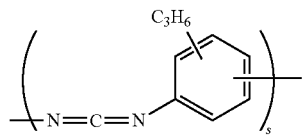
[14-1-3]

(wherein any "s" is the same as described above.)

As the cross-linking agent pertaining to the present invention, among the compounds described in the general formulae [1] to [13] and the polymer described in the general formula [14], the compounds described in the general formula [2], the general formula [3], the general formula [4], the general formula [9], the general formula [10] and the general formula [11], as well as the polymer described in the general formula [14] are preferable, the compounds described in the general formula [2], the general formula [3], the general formula [4] and the general formula [10] are more preferable, and among them, the compound described in the general formula [4] is particularly preferable.

The above-described cross-linking agent pertaining to the present invention may be the commercially available one, or may be synthesized by a method known per se.

[Polymer Pertaining to the Present Invention]

The polymer pertaining to the present invention is the one contained in the binder of the present invention, and the one having a monomer unit derived from acrylic acid, and 1 to 2 kinds of monomer units derived from the compounds shown by the general formula (I), (II) or (III), as constituents, and cross-linked by a cross-linking agent selected from the compounds described by the following general formulae [1] to [13], and the polymer described by the following general formula [14]. It should be noted that as the above-described monomer unit, the one where a double bond in the acrylic acid monomer, the general formula (I), (II), or (III) is converted to a single bond and in a state of an ethylenyl group is counted as one unit.

Ratio of the monomer unit derived from acrylic acid, and the monomer unit derived from the compound shown by the general formula (I), (II), or (III), in the polymer pertaining to the present invention, is usually, as weight ratio, the monomer unit derived from acrylic acid/the monomer unit derived from the compound shown by the general formula (I), (II), or (III)=70/30 to 99/1, and preferably 75/25 to 99/1.

The polymer pertaining to the present invention may be neutralized. In other words, a part or all of the carboxyl groups in the polymer pertaining to the present invention may be converted to a salt. As the neutralized polymer pertaining to the present invention, the one neutralized with an alkali metal such as sodium hydroxide, lithium hydroxide, potassium hydroxide is preferable, and the one neutralized with sodium hydroxide is more preferable. Use of such a neutralized polymer pertaining to the present invention enhances dispersion of an electrode member, leading to uniform distribution of the active material and the conductive compound, therefore electric characteristics of the electrode can be enhanced. Neutralization degree in this case is usually 60 to 100%, preferably 70 to 100%, and more preferably 70 to 90%. In the case where the polymer pertaining to the present invention is subjected to neutralization, usually a cross-linked polymer pertaining to the present invention may be neutralized. A polymer pertaining to the present invention cross-linked using a neutralized acrylic acid as a raw material may be used. It should be noted that the neutralization may be carried out in accordance with a method known per se.

As for viscosity of the polymer pertaining to the present invention, the lower limit thereof is usually 30 mPa·S and preferably 40 mPa·S under 60 rpm of a rotational viscometer, and the upper limit thereof is 800000 mPa·S, preferably 450000 mPa·S and more preferably 400000 mPa·S under 0.6 rpm of the rotational viscometer. It should be noted that the upper limit viscosity under 60 rpm of the rotational viscometer is 10000 mPa·S, and the lower limit viscosity under 0.6 rpm of the rotational viscometer is 10000 mPa·S. The viscosity is a value measured at 20 to 25° C. with a B-type viscometer for a dispersed (suspended) solution of the polymer pertaining to the present invention in water in a concentration of 1% by weight.

Weight average molecular weight of the polymer pertaining to the present invention is usually 1,000 to 10,000,000, and preferably 10,000 to 5,000,000.

[Production Method for the Polymer Pertaining to the Present Invention]

The polymer pertaining to the present invention is produced as follows. That is, the polymer pertaining to the present invention can be produced by subjecting acrylic acid, and 1 to 2 kinds of the compounds shown by the general formula (I), (II) or (III), and the compounds of the general formulae [1] to [13], or the polymer of the general formulae [14] to a polymerization and cross-linking reaction, in the presence of a polymerization initiator, if needed.

It should be noted that use amount of the compounds shown by the general formula (I), (II) or (III) may be set as appropriate, so as to attain weight ratio of the monomer unit derived from acrylic acid, and the monomer unit derived from the compounds shown by the general formula (I), (II) or (III), in the polymer pertaining to the present invention. Use amount of the compounds of the above-described general formulae [1] to [11] is usually 0.001 to 10% by mol, preferably 0.01 to 1% by mol, more preferably 0.05 to 0.5% by mol, and still more preferably 0.1 to 0.3% by mol, relative to 1 mol of acrylic acid. Use amount of the compounds of the general formulae [12] to [13] or the polymer of the general formula [14] is usually 0.01 to 40% by weight, preferably 0.01 to 20% by weight, and more preferably 0.1 to 10% by weight, relative to weight of acrylic acid.

The above-described polymerization and cross-linking reaction may be carried out by a method known per se, and specifically, the reaction may be carried out in a suitable solvent, usually at 30 to 200° C., preferably 70 to 180° C., more preferably 80 to 150° C., usually for 0.1 to 10 hours, and preferably for 0.1 to 5 hours. A polymerization initiator to be used in the above-described polymerization reaction includes, for example, azobisisobutyronitrile, 2,2'-azobis(2,4-dimethylvaleronitrile), 2,2'-azobis(2-methylpropionate), 2,2'-azobis(2-methylbutyronitrile), benzoyl peroxide, lauroyl peroxide, or the like. Use amount of the polymerization initiator is usually 0.01 to 30% by weight, relative to total amount of the reactant. The above-described solvent is not especially limited, as long as it is usually used in this field, and includes, for example, toluene, 1,4-dioxane, tetrahydrofuran, isopropanol, methyl ethyl ketone, propylene glycol monomethyl ether acetate, or the like, and among them, a propylene glycol monomethyl ether acetate is preferable. Used amount thereof is 1 to 10 times volume, relative to total volume of the reactant.

In the case where the compound of the general formula [12] or [13], or the polymer of the general formula [14] is used as a cross-linking agent, as for the above-described polymerization and cross-linking reaction, the cross-linking reaction may be carried out after the polymerization reaction was carried out. Conditions in that case may be set as appropriate, in accordance with the above-described polymerization and cross-linking reaction.

In the case where the polymer pertaining to the present invention is neutralized, it may be neutralized in accordance with a method known per se, using an alkali metal, such as sodium hydroxide, lithium hydroxide, potassium hydroxide, after the above-described polymerization and cross-linking reaction.

The polymer pertaining to the present invention is prepared specifically as follows.

That is, acrylic acid and 1 to 2 kinds of the compounds shown by the general formula (I), (II), or (III), in an amount of 10 to 1 weight parts, relative to 90 to 99 weight parts of acrylic acid, and the compounds of the above-described general formulae [1] to [13] or the polymer of the general formula [14] are dissolved or dispersed in 1 to 10 times volume of a solvent, for example, propylene glycol monomethyl ether acetate, or the like, relative to total volume thereof. After that, they are subjected to a polymerization reaction and a cross-linking reaction at 80 to 150° C., for 1 to 10 hours, to prepare the polymer pertaining to the present invention. In the case where the compounds of the above-described general formulae [1] to [11] are used, they are used in an amount of 0.001 to 10% by mol, relative to 1 mol of acrylic acid, and in the case where the compounds of the general formulae [12] to [13] or the polymer of the general formula [14] are used, they are used in an amount of 0.01 to 20% by weight, relative to weight of acrylic acid.

In the case where the polymer pertaining to the present invention is neutralized, it may be neutralized, in accordance with a method known per se. For example, it may be neutralized by the addition of an alkali metal, such as sodium hydroxide, in an amount to attain 0.6 to 1 mol, relative to 1 mol of the carboxyl group in the resulting polymer pertaining to the present invention. A solvent to be used in this reaction includes a solvent which dissolves or disperses the above-described polymer pertaining to the present invention, or the like.

In the case where the compound of the general formula [12] or [13], or the polymer of the general formulae [14] is used as a cross-linking agent, the polymerization reaction and the cross-linking reaction may be carried out separately, and the method thereof is specifically as follows.

That is, acrylic acid, and 1 to 2 kinds of the compound shown by the general formula (I), (II), or (III), in an amount of 10 to 1 weight parts, relative to 90 to 99 weight parts of acrylic acid, are dissolved or dispersed in 1 to 10 times volume of a solvent, for example, propylene glycol monomethyl ether acetate, or the like, relative to total volume thereof. After that, they are subjected to a polymerization reaction at 80 to 150° C., for 0.1 to 10 hours, to prepare the copolymer pertaining to the present invention. Next, the resulting copolymer, and the compounds shown by the above-described the general formula [12] or [13], or the polymer of the general formula [14], in an amount of 0.01 to 20% by weight, relative to weight of acrylic acid, are dissolved or dispersed in 1 to 10 times volume of a solvent, for example, propylene glycol monomethyl ether acetate, or the like, relative to total volume thereof, and they are subjected to a reaction at 80 to 150° C., for 0.1 to 10 hours, to prepare the polymer pertaining to the present invention. If needed, neutralization may be carried out similarly as described above.

[Binder of the Present Invention]

The binder of the present invention is the one comprises the above-described polymer pertaining to the present invention. It should be noted that, the binder of the present invention also includes the one containing the copolymer pertaining to the present invention, and a cross-linking agent selected from the compound of the general formula [12], the compound of the general formula [13], and the polymer of the general formula [14], at the time of storage (the non-cross-linked one), and is cross-linked by the above-described cross-linking agent, in use.

The binder of the present invention is preferably the one in which the polymer pertaining to the present invention is dissolved or dispersed in a solvent. The solvent includes, for example, water, N-methyl-2-pyrrolidone (NMP), dimethylformamide, dimethylacetamide, methylformamide, dimethylsulfoxide, acetonitrile, tetrahydrofuran, γ-butyrolactone, toluene, methyl ethyl ketone, ethyl acetate, dioxane, or the like, and among them, water or NMP is preferable. Particularly, in the case where the polymer pertaining to the present invention is neutralized, water is preferable. Concentration of the polymer pertaining to the present invention in the binder of the present invention may be appropriately set in matching to concentration to be used in preparation of an electrode, and is usually 1 to 30 mg/mL, and preferably 1 to 10 mg/mL.

[Active Material Containing Silicon]

The active material pertaining to the present invention is the one which contains carbon, germanium, tin, lead, zinc, aluminum, indium, antimony, bismuth, silicon, silicon oxide (SiO, $SiO_2$ or the like), silicon bonded with a metal (SiM: M is a metal such as magnesium, iron, calcium, cobalt, nickel, boron, copper, manganese, silver, vanadium, cerium, zinc), or a mixture of at least 2 or more kinds thereof. Among them, the one which contains carbon, tin, silicon, a silicon oxide, and silicon bonded with a metal, or a mixture of at least 2 or more kinds thereof is preferable, the one which contains carbon, silicon, a silicon oxide, and silicon bonded with a metal, or a mixture of at least 2 or more kinds thereof is more preferable, and the one which contains carbon, silicon, a silicon oxide, or a mixture of at least 2 or more kinds thereof is further preferable. The active material pertaining to the present invention is particularly preferably the one containing silicon, or/and a silicon oxide.

The above-described carbon includes, for example, a graphite-based carbon material (graphite) such as natural graphite, artificial graphite, expanded graphite; carbon black, activated carbon, carbon fiber, cokes, soft carbon, hard carbon, or the like. The preferable one includes the graphite such as natural graphite, artificial graphite, and expanded graphite. The natural graphite includes, for example, scale-like graphite, bulk graphite, or the like. The artificial graphite includes bulk graphite, vapor phase epitaxy graphite, scale-like graphite, or fibrous graphite.

Average particle size of the active material pertaining to the present invention differs depending on a kind of the active material, however, it is usually 1 nm to 100 μm, preferably 1 nm to 50 μm, and more preferably 1 nm to 20 μm.

Content of silicon in the active material pertaining to the present invention is usually 10 to 60% by weight, and preferably 20 to 50% by weight.

[Conductive Assistant]

The conductive assistant pertaining to the present invention includes, carbon black such as acetylene black, Ketjen black, furnace black, thermal black, or the like, and among them, acetylene black and Ketjen black are preferable, and acetylene black is more preferable.

[Composition for Producing Electrode]

The composition for producing an electrode of the present invention is the one comprising 1) the active material containing silicon, pertaining to the present invention, 2) the conductive assistant pertaining to the present invention and 3) the polymer pertaining to the present invention. The composition may be for preparation of a positive electrode, or for preparation of a negative electrode, and it is preferable to be for preparation of the negative electrode.

Content of the active material containing silicon, pertaining to the present invention, in the composition for producing an electrode of the present invention, is 60 to 98% by weight, more preferably 70 to 98% by weight, and still more preferably 80 to 98% by weight, relative to weight of the composition for producing an electrode not including a solvent.

Content of the conductive assistant pertaining to the present invention, in the composition for producing an electrode of the present invention, is 1 to 20% by weight, more preferably 1 to 15% by weight, and still more preferably 1 to 10% by weight, relative to weight of the composition for producing an electrode not including a solvent.

Content of the polymer pertaining to the present invention, in the composition for producing an electrode of the present invention, is 1 to 30% by weight, more preferably 1 to 20% by weight, still more preferably 1 to 15% by weight, and particularly preferably 1 to 10% by weight, relative to weight of the composition for producing an electrode not including a solvent. By making the polymer pertaining to the present invention contained within this range, the active material and the conductive assistant can be dispersed uniformly on a current collector in producing of an electrode, as well as an electrode structure can be maintained, even on silicon expansion.

The composition for producing an electrode of the present invention may comprise, for example, a supporting salt, an ion conductive polymer, a binder (excluding the polymer pertaining to the present invention), or the like, other than the active material containing silicon pertaining to the present invention, the conductive assistant pertaining to the present invention, and the polymer pertaining to the present invention. The supporting salt includes $Li(C_2F_5SO_2)_2N$ (LiBETI), $LiPF_6$, $LiBF_4$, $LiClO_4$, $LiAsF_6$, $LiCF_3SO_3$, or the like. The ion conductive polymer includes, for example, polyethylene oxide (PEO)-based, and polypropylene oxide (PPO)-based polymers. The above-described binder includes, for example, polyfluorovinylidene (PVDF), polytetrafluoroethylene (PTFE), carboxymethylcellulose (CMC), styrene-butadiene copolymer (SBR), an acrylonitrile-butadiene copolymer (NBR), polyacrylonitrile (PAN), ethylene-vinyl alcohol copolymer (EVOH), polyurethane, polyacrylate, polyvinyl ether, polyimide, or the like. Content of these supporting salt, ion conductive polymer, and binder may be set in accordance with amount to be used usually in this field.

The composition for producing an electrode of the present invention is obtained by mixing the active material containing silicon, pertaining to the present invention, the conductive assistant pertaining to the present invention, and the polymer pertaining to the present invention, in a suitable solvent, so as to attain the above-described concentration range. The solvent includes, for example, N-methyl-2-pyrrolidone (NMP), dimethylformamide, dimethylacetamide, methylformamide, dimethylsulfoxide, acetonitrile, tetrahydrofuran, γ-butyrolactone, toluene, methyl ethyl ketone, ethyl acetate, dioxane, or the like, and NMP is preferable.

In the case where the compound shown by the general formula [12] or [13], or the polymer of the general formula [14] is used, as the cross-linking agent in the polymer pertaining to the present invention, the composition for producing an electrode of the present invention may be produced by dispersing or dissolving the active material containing silicon, pertaining to the present invention, the conductive assistant pertaining to the present invention, and the copolymer pertaining to the present invention, as well as the compound shown by the general formula [12] or [13], or the polymer of the general formula [14], in a suitable solvent as described above, and then by subjecting them to a cross-linking reaction. That is, the composition for producing an electrode may be produced at the same time as cross-linking of the copolymer pertaining to the present invention by the cross-linking agent (the compound shown by the general formula [12] or [13], or the polymer shown by the general formula [14]). As for condition or the like of the above-described cross-linking reaction, the same one as described in the preparation method for the polymer pertaining to the present invention of [Binder for lithium cell] is included. Weight average molecular weight of the copolymer pertaining to the present invention to be used in this occasion is usually 1,000 to 10,000,000, and preferably 10,000 to 5,000,000. Use amount of the copolymer pertaining to the present invention in this case may be set appropriately, so that the content of the polymer pertaining to the present invention, in the resulting composition for producing an electrode of the present invention, is within the above-described range. In addition, use amount of the cross-linking agent is usually 0.01 to 40% by weight, preferably 0.01 to 20% by weight, and more preferably 0.1 to 10% by weight, relative to the copolymer pertaining to the present invention. In addition, in the case of neutralization of the polymer pertaining to the present invention, in the above-described method, the composition for producing an electrode of the present invention may be produced by using the copolymer pertaining to the present invention neutralized in advance.

[Current Collector]

A current collector pertaining to the present invention is composed of a foil, a mesh, an expanded grid (an expanded metal), a punched metal or the like, using a conductive material such as nickel, copper, or stainless steel (SUS). Sieve opening of the mesh, wire diameter, number of the mesh, and the like are not especially limited, and those known in the prior art can be used. Preferable thickness of the current collector is 5 to 30 μm. However, the current collector having thickness outside this range may be used.

Size of the current collector is determined in response to the use applications of a cell. In the case of producing a large size electrode to be used in a large size cell, the current collector having large area is used. In the case of manufacturing a small size electrode to be used in a small size cell, the current collector having small area is used.

[Electrode of the Present Invention]

The electrode of the present invention is the one having 1) the active material containing silicon, pertaining to the present invention, 2) the conductive assistant pertaining to the present invention, 3) the polymer pertaining to the present invention, and 4) the current collector pertaining to the present invention. Specifically, it is the one having the current collector pertaining to the present invention, and the active material layer (the composition for producing an electrode pertaining to the present invention) containing, the active material containing silicon, pertaining to the present invention, the conductive assistant pertaining to the present invention and the polymer pertaining to the present invention, formed at the surface thereof. The electrode of the present invention can be used either as a negative electrode or a positive electrode, however, it is preferable to be used as a negative electrode.

In the above-described active material layer, the electrode of the present invention is superior in reversibility, because the polymer pertaining to the present invention disperses uniformly the active material containing silicon and the conductive assistant, and maintains good covering property. Further, the electrode of the present invention is also superior in cycle characteristics, because the polymer pertaining to the present invention significantly increases binding strength between the active materials themselves or binding strength between the active material and the current collector, due to suitable cross-linking degree.

Thickness of the active material layer (thickness of the coating layer) is usually 1 to 500 μm, preferably 1 to 300 μm and more preferably 1 to 150 μm.

The electrode of the present invention can be produced in accordance with the method known per se, except for using the above-described composition for producing an electrode of the present invention, and it can be prepared for example, by coating the above-described composition for producing an electrode pertaining to the present invention (which contains 1) the active material containing silicon, 2) the conductive assistant, and 3) the polymer pertaining to the present invention), on the current collector, drying, and then pressing. The composition for producing an electrode pertaining to the present invention may be enough to be used in an amount for attaining the above-described thickness after drying. It should be noted that, in the case of using the compound shown by the general formula [12] or [13], or the polymer of the general formula [14], as the cross-linking agent in the polymer pertaining to the present invention, the electrode of the present invention may be prepared by coating a solution containing the copolymer pertaining to the present invention instead of the polymer pertaining to the present invention, and these cross-linking agents, onto the current collector, subjecting it to cross-linking on the current collector, drying and pressing. Alternatively, cross-linking degree may be increased by coating the composition for producing an electrode containing the polymer pertaining to the present invention with lower cross-linking degree, onto the current collector, and making the cross-linking reaction promoted.

As a method for coating the composition for producing an electrode of the present invention, on the current collector, for example, a self-propelled coater, an ink jet method, a doctor blade method, a spray method, or a combination thereof can be used, and a doctor blade method or an ink jet method, which can form a thin layer, is preferable, and a doctor blade method is more preferable.

Drying may be carried out in accordance with a method known per se, and it is carried out usually by heating treatment. Drying condition (necessity of vacuum, drying time, drying temperature) in heating may be set appropriately in response to coating amount or volatilization speed of the composition for producing an electrode of the present invention.

A press method may also be carried out in accordance with a method known per se, and includes, for example, a calender roll method, a flat plate press, or the like, and the calender roll method is preferable.

The above-described electrode of the present invention is the one which can be used for a lithium cell, and can be used for any of a usual cell as long as it is composed of a positive electrode, an electrolyte and a negative electrode.

As the electrolyte, the one having the additives such as vinylene carbonate, fluorovinylene carbonate, methylvinylene carbonate, fluoromnethylvinylene carbonate, ethylvinylene carbonate, propylvinylene carbonate, butylvinylene carbonate, dipropylvinylene carbonate, 4,5-dimethylvinylene carbonate, 4,5-diethylvinylene carbonate, vinylethylene carbonate, divinylethylene carbonate, phenylethylene carbonate, diallyl carbonate, fluoroethylene carbonate (FEC), catechol carbonate, 1,3-propane sultone, and butane sultone is preferable, and among them, the one having fluoroethylene carbonate (FEC) is particularly preferable. Content of the additives in the electrolyte is usually 0.5% to 15%, and preferably 0.5 to 5%.

Explanation will be given below in detail on the present invention with reference to Examples, however, the present invention should not be limited thereto.

EXAMPLES

Synthesis Example 1

Synthesis of a Cross-Linked Copolymer P-01

Into a 200 mL round-bottom flask equipped with a stirring apparatus, a cooling tube, a thermometer, and a nitrogen introducing tube, 10 g of propylene glycol monomethyl ether acetate (produced by Wako Pure Chemical Industries, Ltd.) was charged, and heated till attaining an inner temperature of 90° C., under nitrogen gas flow. Next, a solution mixed with 9.2 g of acrylic acid (0.13 mol, produced by Wako Pure Chemical Industries, Ltd.), 0.78 g of 2-hydroxyethyl acrylate (6.7 mmol, produced by Tokyo Chemical Industry Co., Ltd.), 0.03 g of diethylene glycol diallyl ether (0.18 mmol, produced by Wako Pure Chemical Industries, Ltd.), and 13 g of propylene glycol monomethyl ether acetate was dropped in to the round-bottom flask taking 2 hours. After that, the resulting solution was subjected to a reaction at 90° C. for 2 hours. After the reaction, the solution was cooled down to room temperature, and 30 g of propylene glycol monomethyl ether acetate was added for dilution to obtain a cross-linked copolymer. This was adopted as the cross-linked copolymer P-01 (acrylic acid/2-hydroxyethyl acrylate=95/5).

Synthesis Example 2

Synthesis of a Cross-Linked Copolymer P-02

A cross-linked copolymer was obtained by subjecting to a polymerization reaction by a similar method as in Synthesis Example 1, except for using 0.68 g of dimethylacrylamide (6.8 mmol, produced by Wako Pure Chemical Industries, Ltd.), instead of 0.78 g of 2-hydroxyethyl acrylate. This was adopted as the cross-linked copolymer P-02 (acrylic acid/dimethylacrylamide=95/5).

Synthesis Example 3

Synthesis of a Cross-Linked Copolymer P-03

A cross-linked copolymer was obtained by subjecting to a polymerization reaction by a similar method as in Synthesis Example 1, except for using 7.5 g (0.10 mol) of acrylic acid, and 2.5 g of methacrylate methoxypolyethylene glycol (5.4 mmol, produced by Shin-Nakamura Chemical Co., Ltd.), instead of 9.2 g of acrylic acid and 0.78 g of 2-hydroxyethyl acrylate. This was adopted as the cross-linked copolymer P-03 (acrylic acid/methacrylate methoxypolyethylene glycol=95/5).

Synthesis Example 4

Synthesis of a Cross-Linked Copolymer P-04

A cross-linked copolymer was obtained by subjecting to a polymerization reaction by a similar method as in Synthesis Example 1, except for using 0.84 g of 2-cyanoethyl acrylate (6.7 mmol, produced by Tokyo Chemical Industry Co., Ltd.), instead of 0.78 g of 2-hydroxyethyl acrylate. This was adopted as the cross-linked copolymer P-04 (acrylic acid/2-cyanoethyl acrylate=95/5).

Synthesis Example 5

Synthesis of a Cross-Linked Copolymer P-05

A cross-linked copolymer was obtained by subjecting to a polymerization reaction by a similar method as in Synthesis Example 1, except for using 7.6 g of acrylic acid (0.11 mol) and 2.3 g of 2-(perfluorohexyl)ethyl acrylate (5.6 mmol, produced by Unimatec Co., Ltd.), instead of 9.2 g of acrylic acid and 0.78 g of 2-hydroxyethyl acrylate. This was adopted as the cross-linked copolymer P-05 (acrylic acid/2-(perfluorohexyl)ethyl acrylate=95/5).

Synthesis Example 6

Synthesis of a Cross-Linked Copolymer P-06

A cross-linked copolymer was obtained by subjecting to a polymerization reaction by a similar method as in Synthesis Example 1, except for using 7.6 g (0.11 mol) of acrylic acid and 1.0 g (0.12 mmol) of hexyl acrylate, instead of 9.2 g of acrylic acid and 0.78 g of 2-hydroxyethyl acrylate. This was adopted as the cross-linked copolymer P-06 (acrylic acid/hexyl acrylate=95/5).

Synthesis Example 7

Synthesis of a cross-linked copolymer P-07

A cross-linked copolymer was obtained by subjecting to a polymerization reaction by a similar method as in Synthesis Example 1, except for using 8.8 g (0.12 mol) of acrylic acid and 1.2 g of phenoxyethyl acrylate (6.4 mmol, produced by Tokyo Chemical Industry Co., Ltd.), instead of 9.2 g of acrylic acid and 0.78 g of 2-hydroxyethyl acrylate. This was adopted as the cross-linked copolymer P-07 (acrylic acid/phenoxyethyl acrylate=95/5).

Synthesis Example 8

Synthesis of a Cross-Linked Copolymer P-08

A cross-linked copolymer was obtained by subjecting to a polymerization reaction by a similar method as in Synthesis Example 1, except for using 42.0 g of acrylic acid (0.58 mol) and 3.5 g of N-isopropylacrylamide (30.7 mmol, produced by Wako Pure Chemical Industries, Ltd.), instead of 9.2 g of acrylic acid and 0.78 g of 2-hydroxyethyl acrylate. This was adopted as the cross-linked copolymer P-08 (acrylic acid/N-isopropylacrylamide=95/5).

Synthesis Example 9

Synthesis of a Cross-Linked Copolymer P-09

A cross-linked copolymer was obtained by subjecting to a polymerization reaction by a similar method as in Synthesis Example 1, except for using 45.0 g (0.62 mol) of acrylic acid and 11.25 g of acrylamide (0.16 mmol, produced by Wako Pure Chemical Industries, Ltd.), instead of 9.2 g of acrylic acid and 0.78 g of 2-hydroxyethyl acrylate. This was adopted as the cross-linked copolymer P-09 (acrylic acid/acrylamide=80/20).

Synthesis Example 10

Synthesis of a Cross-Linked Copolymer P-10

A cross-linked copolymer was obtained by subjecting to a polymerization reaction by a similar method as in Synthesis Example 1, except for using 45.0 g (0.62 mol) of acrylic acid and 11.25 g of acrylonitrile (0.21 mol, produced by Wako Pure Chemical Industries, Ltd.), instead of 9.2 g of acrylic acid and 0.78 g of 2-hydroxyethyl acrylate. This was adopted as the cross-linked copolymer P-10 (acrylic acid/acrylonitrile=75/25).

Synthesis Example 11

Synthesis of a Cross-Linked Copolymer P-11

A cross-linked copolymer was obtained by subjecting to a polymerization reaction by a similar method as in Synthesis Example 1, except for using 45.0 g (0.62 mol) of acrylic acid and 11.25 g of Blemmer-AE-200 (0.04 mol, produced by NOF corp.), instead of 9.2 g of acrylic acid and 0.78 g of 2-hydroxyethyl acrylate. This was adopted as the cross-linked copolymer P-11 (acrylic acid/Blemmer-AE-200=94/6).

Synthesis Example 12

Synthesis of a Cross-Linked Copolymer P-12

A cross-linked copolymer was obtained by subjecting to a polymerization reaction by a similar method as in Synthesis Example 1, except for using 35.0 g (0.49 mol) of acrylic acid and 10.45 g of methacrylic acid (0.10 mol, produced by Wako Pure Chemical Industries, Ltd.), instead of 9.2 g of acrylic acid and 0.78 g of 2-hydroxyethyl acrylate. This was adopted as the cross-linked copolymer P-12 (acrylic acid/methacrylic acid=80/20).

Example 1

Production of a Cell Using an Electrode of the Present Invention (1) Preparation of a Binder To 230 mL of water, 2.3 g of cross-linked copolymer P-01 was added and dispersed by stirring for 2 hours. Into the resulting dispersed solution, 18% sodium hydroxide aqueous solution was added to adjust pH thereof to 6.8, to obtain a 1% by weight gel solution of a neutralized copolymer. The resulting gel solution of the copolymer was adopted as the binder.

(2) Production of a Composition for Preparation of an Electrode

Using a planet ball mill (Pulverisette 7, produced by Fristsch Inc.), 18 mg of nano-sized silicon powder (particle size: 100 nm, produced by Sigma-Aldrich Co. LLC.), 30 mg of natural graphite (particle size: 3 μm, produced by SEC Carbon Ltd.), and 6 mg of Ketjen Black (KB, produced by Lion Co.) were sufficiently mixed for 12 hours under 600 rpm. The resulting mixture (si: graphite: KB=30:50:10, in weight ratio) was used as an electrode material. Next, 0.045 g of the above-described electrode material was added to 0.5 g of the binder obtained in (1), 0.4 g of water was added and mixed at room temperature for 20 minutes to produce slurry for producing an electrode. In the slurry for producing the electrode, 15 mg of silicon, 25 mg of graphite, 5 mg of KB, and 5 mg of the cross-linked copolymer are included in 900 μL of the slurry. That is, the slurry for producing the electrode became a coating film containing 30% by weight of silicon, 50% by weight of graphite, 10% by weight of KB, and 10% by weight of the cross-linked copolymer, by coating it on a current collector, and then drying it.

(3) Production of an Electrode for a Lithium Cell

The slurry for producing the electrode obtained in (2) was coated on a copper current collector using a doctor blade. After that, it was dried in air at 80° C. and then dried under vacuum at 150° C. for 24 hours. It should be noted that it was pressed using a roll before use to make an electrode (the CLPAH01 electrode). It should be noted that thickness of a film on the current collector was about 10 to 15 μm by measurement using a vernier caliper.

(4) Production of a Coin-Type Cell

A coin-type cell was assembled in a glove box filled with argon. Here, the coin-type cell composed of the electrode obtained in (3), a lithium foil electrode, a solution of an ethylene carbonate (EC)/dimethyl carbonate (DMC) (1:1 in volume ratio) containing 1 M $LiPF_E$ and a separator, was assembled.

Examples 2 to 8

Production of a Cell Using the Electrode of the Present Invention

Various electrodes for a lithium cell, and the coin-type cells were produced by a similar method as in Example 1, except for using each of the cross-linked copolymers P-02 to P-08, instead of the cross-linked copolymer P-01 in Example 1. The electrodes obtained using the cross-linked polymers P-02 to P-08 were adopted as the CLPAH02 electrode, the CLPAH03 electrode, the CLPAH04 electrode, the CLPAH05 electrode, the CLPAH06 electrode, the CLPAH07 electrode, and the CLPAH08 electrode, respectively.

Comparative Example 1

Production of a Cell Using a Cross-Linked Homopolymer as a Binder (1) Synthesis of a Cross-Linked Homopolymer CLPA-07

A cross-linked homopolymer was obtained by subjecting to a polymerization reaction by a similar method as in Synthesis Example 1, except for using a solution mixed with 9.65 g of acrylic acid (0.14 mol, produced by Wako Pure Chemical Industries, Ltd.), 0.03 g (0.18 mmol) of diethylene glycol diallyl ether, and 13 g of propylene glycol monomethyl ether acetate, instead of using a solution mixed with 9.2 g of acrylic acid, 0.78 g of 2-hydroxyethyl acrylate, 0.03 g of diethylene glycol diallyl ether, and 13 g of propylene glycol monomethyl ether acetate. This was adopted as the cross-linked homopolymer CLPA-07.

(2) Production of a Cell Using the Cross-Linked Homopolymer

An electrode for a lithium cell, and a coin-type cell were produced by a similar method as in Example 1, except for using the cross-linked homopolymer CLPA-07, instead of the cross-linked copolymer P-01 in Example 1. The electrode obtained by using the cross-linked homopolymer CLPA-07 was adopted as the CLPA-07 electrode.

Experiment Example 1

Charge-Discharge Test Using Various Electrodes

Using each of the electrodes of the CLPAH01 to 08 electrodes, and the CLPA-07 electrode, a constant current charge-discharge test was carried out under the following condition. As for the result of the initial charge-discharge, and the $10^{th}$ charge-discharge, using each of the electrodes, charge-discharge capacity, coulombic efficiency and retention rate thereof are shown in Table 1.

Counter electrode: Li foil
Electrolytic solution: a mixed solution of EC/DMC (1:1 in volume ratio) containing 1 M $LiPF_6$
Measuring equipment: ABE1024-5V, 0.1A-4 charge-discharge test equipment (produced by Electro Field Co., Ltd.)
Potential and current density
The first cycle
Potential range 2.0 to 0.0 V (vs. $Li/Li^+$)
Current density 50 mAh/g
The $2^{nd}$ and the subsequent cycles
Potential range 2.0 to 0.0 V (vs. Li/Li)
Current density 100 mAh/g

TABLE 1

| Example/ Comparative Example | Binder | Cross-linking agent | Compound forming monomer other than acrylic acid | Amount of cross-linking agent (mol %) | Viscosity (60 rpm) | Initial charge-discharge | | | 10th charge-discharge | | |
|---|---|---|---|---|---|---|---|---|---|---|---|
| | | | | | | Charge capacity (mAh/g) | Discharge capacity (mAh/g) | Coulombic efficiency % | Charge capacity (mAh/g) | Discharge capacity (mAh/g) | Coulombic efficiency % |
| Expl. 1 | CLPAH01 | Diethylene glycol diallyl ether | Hydroxyethyl acrylate | 0.14 | 180 | 1755 | 1197 | 68.2% | 1092 | 1053 | 96.5% |
| Expl. 2 | CLPAH02 | Diethylene glycol diallyl ether | Dimethylacrylamide | 0.14 | 280 | 1667 | 1277 | 76.6% | 1201 | 1165 | 97.0% |
| Expl. 3 | CLPAH03 | Diethylene glycol diallyl ether | Ethylene glycol monomethyl ether methacrylate | 0.14 | 200 | 1686 | 1190 | 70.6% | 1093 | 1055 | 96.6% |
| Expl. 4 | CLPAH04 | Diethylene glycol diallyl ether | Cyanoethyl acrylate | 0.14 | 250 | 1607 | 1162 | 72.3% | 1095 | 1058 | 96.6% |
| Expl. 5 | CLPAH05 | Diethylene glycol diallyl ether | (Perfluorohexyl) ethyl acrylate | 0.14 | 145 | 1758 | 1327 | 75.5% | 1180 | 1142 | 96.8% |

TABLE 1-continued

| Example/Comparative Example | Binder | Cross-linking agent | Compound forming monomer other than acrylic acid | Amount of cross-linking agent (mol %) | Viscosity (60 rpm) | Initial charge-discharge | | | 10th charge-discharge | | |
|---|---|---|---|---|---|---|---|---|---|---|---|
| | | | | | | Charge capacity (mAh/g) | Discharge capacity (mAh/g) | Coulombic efficiency % | Charge capacity (mAh/g) | Discharge capacity (mAh/g) | Coulombic efficiency % |
| Expl. 6 | CLPAH06 | Diethylene glycol diallyl ether | Hexyl acrylate | 0.14 | 200 | 1667 | 1289 | 77.3% | 1145 | 1108 | 96.7% |
| Expl. 7 | CLPAH07 | Diethylene glycol diallyl ether | Phenoxyethyl acrylate | 0.14 | 170 | 1767 | 1370 | 77.5% | 1272 | 1231 | 96.8% |
| Expl. 8 | CLPAH05 | Diethylene glycol diallyl ether | N-isopropyl-acrylamide | 0.14 | 200 | 1824 | 1398 | 76.6% | 1268 | 1225 | 96.6% |
| Com. Expl. 1 | CLPA-07 | Diethylene glycol diallyl ether | None | 0.14 | 270 | 1477 | 1130 | 76.5% | 1079 | 1046 | 97.0% |
| Com. Expl. 2 | Carbopol | unknown | None | unknown | — | 1551 | 1076 | 69.4% | 840 | 813 | 96.9% |
| Com. Expl. 3 | Aldrich | not cross-linked | None | — | — | 1442 | 971 | 67.3% | 869 | 837 | 97.0% |

It should be noted that structural formulae of monomers used other than acrylic acid in CLPAH01 to 08 are as follows.

CLPAH01:
Hydroxylethyl acrylate

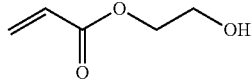

CLPAH02:
Dimethylacrylamide

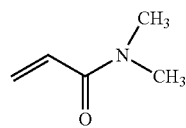

CLPAH03:
Ethylene glycol monomethyl ether methacrylate

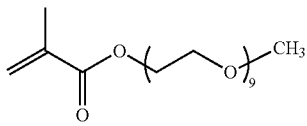

CLPAH04:
Cyanoethyl acrylate

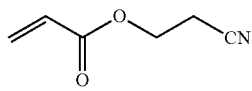

CLPAH05:
(Perfluorohexyl)ethyl acrylate

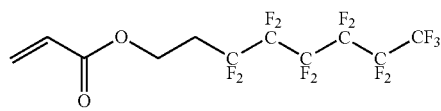

CLPAH06:
Hexyl acrylate

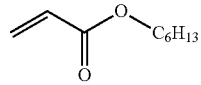

CLPAH07:
Phenoxyethyl acrylate

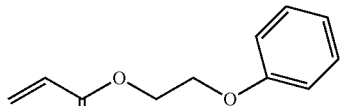

CLPAH08:
N-isopropylacrylamide

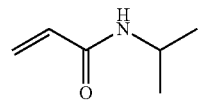

From the result of Table 1, it has been understood that all of those, where the binders of the present invention obtained by cross-linking of the copolymer were used, exhibit higher value of capacity at the initial charge-discharge and capacity at the $10^{th}$ charge-discharge, as compared with CLPA-07 obtained by cross-linking of the homopolymer. Reason for this is considered that by using the copolymer, dispersion of silicon or graphite as the active material at the electrode surface is improved, effective surface area of the active material is increased and thus capacity is enhanced.

Example 9

In this Example, an electrode having a thick active material layer was produced, which is expected as a cell having higher capacity, as compared with the cells of Examples 1 to 8.

(1) Preparation of a Binder

To 61 mL of water, 5.0 g of cross-linked copolymer P-01 was added. Still more, 10.4 mL of a 5M sodium hydroxide aqueous solution was added and dispersed by stirring for 12 hours to obtain a 10% by weight gel solution of a neutralized copolymer. The resulting gel solution of the copolymer was adopted as a binder.

(2) Production of a Composition for Preparation of an Electrode

Using a planet ball mill (Pulverisette 7, produced by Fristsch Inc.), 4.50 g of the binder obtained in (1), 4.5 g of ion-exchanged water, 1.35 g of silicon powder (Silgrain e-Si400, particle size: 2.4 μm, produced by ELKEM Co. LLC.), 2.25 g of natural graphite (particle size: 3 μm, produced by SEC Carbon Ltd.), and 0.045 g of Acetylene Black (Denka black, produced by DENKI KAGAKU KOGYO KABUSHIKI KAISHA) were sufficiently mixed for 30 minutes under 600 rpm. The resulting mixture was used as slurry for preparation of an electrode. In the slurry for producing an electrode, 1.35 g of silicon, 2.25 g of graphite, 0.045 g of Acetylene Black, and 0.45 g of the cross-linked copolymer are included in total amount of the slurry. That is, the slurry for producing an electrode became a coating film containing 33% by weight of silicon, 55% by weight of graphite, 1% by weight of Acetylene Black, and 11% by weight of cross-linked copolymer, by coating it on a current collector, and then drying it.

(3) Production of an Electrode for a Lithium Cell

The slurry for producing an electrode obtained in (2) was coated on a copper current collector using a doctor blade. After that, it was dried in air at 80° C. for 12 hours, and then dried under vacuum at 150° C. for 24 hours. It should be noted that it was pressed using a roll before use to make an electrode (the CLPAH01-2 electrode). It should be noted that thickness of the film on the current collector was about 30 to 70 μm by measurement using a vernier caliper.

(4) Production of a Coin-Type Cell

A coin-type cell was assembled by a similar method as in Example 1 (4), except for using the CLPAH01-2 as an electrode.

Examples 10 to 18

Production of a Cell Using the Electrode of the Present Invention

Various electrodes for a lithium cell, and the coin-type cells were produced by a similar method as in Example 1, except for using each of the cross-linked copolymers P-02, P-05 to P-12, instead of the cross-linked copolymer P-01 in Example 9. The electrodes obtained using the cross-linked polymers P-02, P-05 to P-12 were adopted as the CLPAH02-2 electrode, the CLPAH05-2 electrode, the CLPAH06-2 electrode, the CLPAH07-2 electrode, the CLPAH08-2 electrode, the CLPAH09-2 electrode, the CLPAH10-2 electrode, the CLPAH11-2 electrode, and the CLPAH12-2 electrode, respectively.

Comparative Example 4

Production of a Cell Using the Cross-Linked Homopolymer as a Binder

An electrode for a lithium cell, and a coin-type cell were produced by a similar method as in Example 9, except for using the cross-linked homopolymer CLPA-07, instead of the cross-linked copolymer P-01 in Example 9. The electrodes obtained using the cross-linked homopolymer CLPA-07 was adopted as the CLPA-07-2 electrode.

Experiment 9

Charge-Discharge Test Using Various Kinds of Electrodes

Using each of the CLPAH01-2 to 02-2, 05-2 to 12-2 electrodes, and the CLPA07-02 electrode, a constant current charge-discharge test was carried out under the same condition as in Example 1.

TABLE 2

| Example/Comparative Example | Electrode | Cross-linking agent | Monomer other than acrylic acid | Amount of cross-linking agent (mol %) | Initial charge-discharge | | |
|---|---|---|---|---|---|---|---|
| | | | | | Charge capacity (mAh/g) | Discharge capacity (mAh/g) | Coulombic efficiency % |
| Expl. 9 | CLPAH01-2 | Diethylene glycol diallyl ether | Hydroxyethyl acrylate | 0.14 | 1623 | 1515 | 93.4% |
| Expl. 10 | CLPAH02-2 | Diethylene glycol diallyl ether | N,N-dimethylacrylamide | 0.14 | 1601 | 1500 | 93.9% |
| Expl. 11 | CLPAH05-2 | Diethylene glycol diallyl ether | (Perfluorohexyl) ethyl acrylate | 0.14 | 1597 | 1469 | 92.0% |
| Expl. 12 | CLPAH06-2 | Diethylene glycol diallyl ether | Hexyl acrylate | 0.14 | 1616 | 1513 | 93.6% |
| Expl. 13 | CLPAH07-2 | Diethylene glycol diallyl ether | Phenoxyethyl acrylate | 0.14 | 1591 | 1502 | 94.4% |
| Expl. 14 | CLPAH08-2 | Diethylene glycol diallyl ether | N-isopropyl-acrylamide | 0.14 | 1644 | 1540 | 93.7% |
| Expl. 15 | CLPAH09-2 | Diethylene glycol diallyl ether | Acrylamide | 0.14 | 1607 | 1503 | 93.6% |

TABLE 2-continued

| Example/ Comparative Example | Electrode | Cross-linking agent | Monomer other than acrylic acid | Amount of cross-linking agent (mol %) | Initial charge-discharge | | |
|---|---|---|---|---|---|---|---|
| | | | | | Charge capacity (mAh/g) | Discharge capacity (mAh/g) | Coulombic efficiency % |
| Expl. 16 | CLPAH10-2 | Diethylene glycol diallyl ether | Acrylonitrile | 0.14 | 1607 | 1502 | 93.5% |
| Expl. 17 | CLPAH11-2 | Diethylene glycol diallyl ether | Blemmer-AE-200 | 0.14 | 1613 | 1493 | 92.5% |
| Expl. 18 | CLPAH12-2 | Diethylene glycol diallyl ether | Methacrylic acid | 0.14 | 1624 | 1505 | 92.7% |
| Com. Expl. 4 | CLPA07-2 | Diethylene glycol diallyl ether | None | 0.14 | 1550 | 1452 | 93.7% |

It should be noted that structural formulae of monomers used other than acrylic acid in CLPAH01-2 to 02-2, 05-2 to 12-2 are as follows.

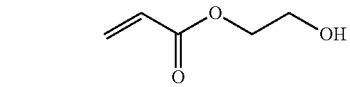

Hydroxylethyl acrylate    CLPAH01-2

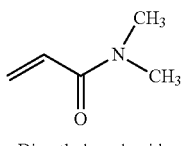

Dimethylacrylamide    CLPAH02-2

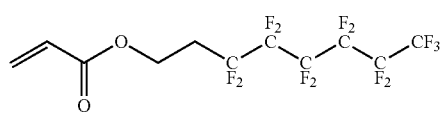

(Perfluorohexyl)ethyl acrylate    CLPAH05-2

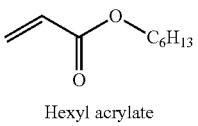

Hexyl acrylate    CLPAH06-2

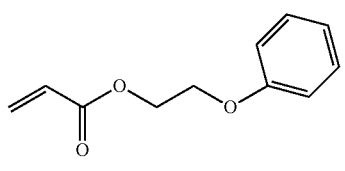

Phenoxyethyl acrylate    CLPAH07-2

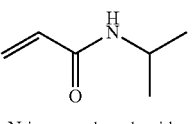

N-isopropylacrylamide    CLPAH08-2

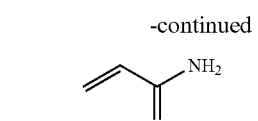

Acrylamide    CLPAH09-2

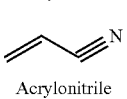

Acrylonitrile    CLPAH10-2

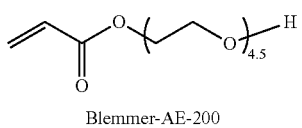

Blemmer-AE-200    CLPAH11-2

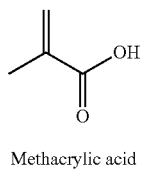

Methacrylic acid    CLPAH12-2

From the result of Table 2, it has been understood that all of those, where the binders of the present invention obtained by cross-linking of the copolymer were used, linear exhibit higher value of capacity at the initial charge-discharge, as compared with CLPA-07-2 obtained by cross-linking of the homopolymer. Reason for this is considered that by using the copolymer, dispersion of silicon or graphite as the active material at the electrode surface is improved, effective surface area of the active material is increased, and thus capacity is enhanced.

Still more, as for CLPAH01-2, CLPAH07-2, CLPAH09-2, CLPAH10-2, CLPAH12-2, and CLPA07-2, discharge capacity after 10 cycles was also confirmed. Discharge capacities thereof after 10 cycles were each CLPAH01-2: 1104 mAh/g, CLPAH07-2: 1006 mAh/g, CLPAH09-2: 1164 mAh/g, CLPAH10-2: 1020 mAh/g, CLPAH12-2: 1027 mAh/g, and it has been understood to exhibit higher values than the result of CLPA07-2 (974 mAh/g). Among these, it is considered that, in CLPAH01-2, CLPAH09-2, CLPAH10-2, break down of the electrode was suppressed by strong interaction with the active material due to hydrogen bond or π-electron interaction, and in CLPAH12-2, break down of the electrode was suppressed, due to containing a structure of methacrylic acid having high glass transition temperature, in the copolymer, leading to a rigid binder, thus each capacity was enhanced.

The invention claimed is:

1. A binder for a lithium cell, comprising a polymer having
   (i) an acrylic acid monomer unit, and
   (ii) 1 to 2 kinds of monomer units other than acrylic acid derived from a compound represented by the following general formula (I) or general formula (II), as constituents, and
   cross-linked by a cross-linking agent which is a compounds represented by the following general formulae [4];

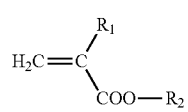

wherein $R_1$ represents hydrogen atom or a methyl group, and provided that in the case where $R_2$ is hydrogen atom, $R_1$ represents a methyl group; $R_2$ represents hydrogen atom, an alkyl group having 1 to 20 carbon atoms; an alkyl group having 1 to 20 carbon atoms, which is substituted with fluorine atom, a hydroxyl group or a cyano group; an aryl group having 6 to 10 carbon atoms; an arylalkyl group having 7 to 13 carbon atoms; an alkoxyalkyl group having 2 to 9 carbon atoms; an alkoxyalkoxyalkyl group having 3 to 9 carbon atoms; an aryloxyalkyl group having 7 to 13 carbon atoms; a morpholinoalkyl group having 5 to 7 carbon atoms; a trialkylsilyl group having 3 to 9 carbon atoms; an alicyclic hydrocarbon group having 6 to 10 carbon atoms, which has oxygen or does not have oxygen; a dialkylaminoalkyl group having 3 to 9 carbon atoms; a hexahydrophthalimide-N-alkyl group having 9 to 15 carbon atoms; the group shown by the following general formula (IV)

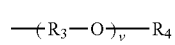

wherein $R_3$ represents an alkylene group having 1 to 6 carbon atoms, which has a hydroxyl group as a substituent or does not have a substituent; $R_4$ represents hydrogen atom, an alkyl group having 1 to 6 carbon atoms, or a phenyl group; "v" represents an integer of 2 to 20;
or the group shown by the following general formula (V)

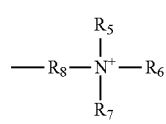

wherein $R_5$ to $R_7$ each independently represent an alkyl group having 1 to 3 carbon atoms;

$R_8$ represents an alkylene group having 1 to 3 carbon atoms,

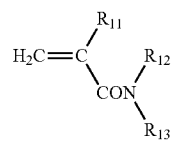

wherein $R_{11}$ represents hydrogen atom or a methyl group; $R_{12}$ represents hydrogen atom, or alkyl group having 1 to 6 carbon atoms; $R_{13}$ represents hydrogen atom, an alkyl group having 1 to 6 carbon atoms; a dialkylaminoalkyl group having 3 to 9 carbon atoms; or a hydroxyalkyl group having 1 to 6 carbon atoms,

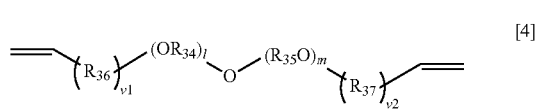

wherein $R_{34}$ to $R_{37}$ each independently represent an alkylene group having 1 to 6 carbon atoms; l represents an integer of 1 to 6; m represents an integer of 0 to 6; v1 and v2 each independently represent an integer of 0 or 1.

2. The binder according to claim 1, wherein the polymer has
   (i) the acrylic acid monomer unit, and
   (ii) 1 to 2 kinds of monomer units other than acrylic acid derived from a compound represented by the following general formula (I-I) or general formula (II-I), as constituents;

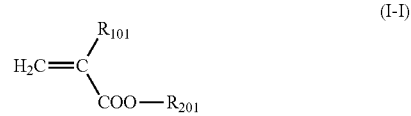

wherein $R_{101}$ represents hydrogen atom or a methyl group, and provided that when $R_{201}$ is hydrogen atom, $R_{101}$ represents a methyl group; $R_{201}$ represents hydrogen atom, the alkyl group having 1 to 20 carbon atoms, the alkyl group having 1 to 20 carbon atoms, substituted with fluorine atom, a hydroxyl group or a cyano group, the arylalkyl group having 7 to 13 carbon atoms, the aryloxyalkyl group having 7 to 13 carbon atoms, the hexahydrophthalimide-N-alkyl group having 9 to 15 carbon atoms, or the group shown by the following general formula (IV-I)

wherein $R_{301}$ represents the alkylene group having 1 to 3 carbon atoms, which has a hydroxyl group as a substituent or does not have a substituent; $R_{401}$ represents hydrogen atom, the alkyl group having 1 to 6 carbon atoms, or a phenyl group; and "v" is the same as described above,

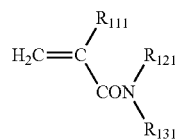

(II-I)

wherein $R_{111}$ represents hydrogen atom or a methyl group; $R_{121}$ represents hydrogen atom, the alkyl group having 1 to 6 carbon atoms; and $R_{131}$ represents hydrogen atom, the alkyl group having 1 to 6 carbon atoms, or the hydroxyalkyl having 1 to 6 carbon atoms.

3. The binder according to claim 2, wherein the polymer has
   (i) the acrylic acid monomer unit, and
   (ii) 1 to 2 kinds of monomer units other than acrylic acid derived from a compound represented by the following general formula (I-II) or general formula (II-II), as constituents:

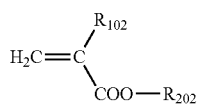

(I-II)

wherein $R_{102}$ represents hydrogen atom or a methyl group (provided that when $R_{202}$ is hydrogen atom, $R_{102}$ represents a methyl group); $R_{202}$ represents hydrogen atom, the alkyl group having 1 to 20 carbon atoms, the alkyl group having 1 to 20 carbon atoms, substituted with fluorine atom, a hydroxyl group or a cyano group, the aryloxyalkyl group having 7 to 13 carbon atoms, or the group shown by the following general formula (IV-II)

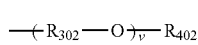

(IV-II)

wherein $R_{302}$ represents the alkylene group having 1 to 3 carbon atoms; $R_{402}$ represents hydrogen atom, or the alkyl group having 1 to 6 carbon atoms; and "v" is the same as described above,

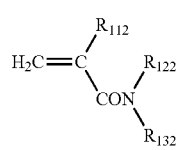

(II-II)

wherein $R_{112}$ represents hydrogen atom or a methyl group; $R_{122}$ and $R_{132}$ each independently represent hydrogen atom, or the alkyl group having 1 to 3 carbon atoms.

4. The binder according to claim 1, wherein the polymer has
   (i) the acrylic acid monomer unit, and
   (ii) 1 to 2 kinds of monomer units other than acrylic acid derived from a compound represented by the following general formula (I-II) or general formula (II-II), as constituents:

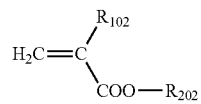

(I-II)

wherein $R_{102}$ represents hydrogen atom or a methyl group (provided that when $R_{202}$ is hydrogen atom, $R_{102}$ represents a methyl group); $R_{202}$ represents hydrogen atom, the alkyl group having 1 to 20 carbon atoms, the alkyl group having 1 to 20 carbon atoms, substituted with fluorine atom, a hydroxyl group or a cyano group, the aryloxyalkyl group having 7 to 13 carbon atoms, or the group shown by the following general formula (IV-II)

(IV-II)

wherein $R_{302}$ represents the alkylene group having 1 to 3 carbon atoms; $R_{402}$ represents hydrogen atom, or the alkyl group having 1 to 6 carbon atoms; and "v" is the same as described above,

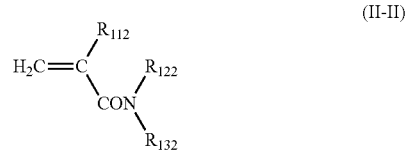

(II-II)

wherein $R_{112}$ represents hydrogen atom or a methyl group; $R_{122}$ and $R_{132}$ each independently represent hydrogen atom, or the alkyl group having 1 to 3 carbon atoms.

5. The binder according to claim 1, wherein the polymer is neutralized.

6. The binder according to claim 1, wherein the polymer is neutralized with sodium hydroxide.

7. The binder according to claim 1, wherein the polymer is dissolved or dispersed in water.

8. A composition for preparation of an electrode of a lithium cell, comprising 1) an active material containing silicon, 2) a conductive assistant, and 3) the binder for a cell according to claim 1.

9. The composition according to claim 8, wherein the active material containing silicon contains carbon, silicon, a silicon oxide, silicon bonded with a metal, or the mixed one of at least two or more kinds thereof.

10. The composition according to claim 9, wherein an electrode is a negative electrode.

11. An electrode for a lithium cell, having 1) an active material containing silicon, 2) a conductive assistant, 3) the binder for a cell according to claim 1, and (4) a current collector.

12. The electrode according to claim 11, wherein the active material containing silicon contains carbon, silicon, a silicon oxide, silicon bonded with a metal, or the mixed one of at least two or more kinds thereof.

13. The electrode according to claim 12, wherein the electrode is a negative electrode.

* * * * *